(12) United States Patent
Shimizu

(10) Patent No.: US 12,454,165 B2
(45) Date of Patent: Oct. 28, 2025

(54) VEHICLE AIR CONDITIONING APPARATUS

(71) Applicant: SANDEN CORPORATION, Isesaki (JP)

(72) Inventor: Nobutaka Shimizu, Isesaki (JP)

(73) Assignee: SANDEN CORPORATION, Isesaki (JP)

( * ) Notice: Subject to any disclaimer, the term of this patent is extended or adjusted under 35 U.S.C. 154(b) by 148 days.

(21) Appl. No.: 18/281,369

(22) PCT Filed: Mar. 22, 2022

(86) PCT No.: PCT/JP2022/013271
§ 371 (c)(1),
(2) Date: Sep. 11, 2023

(87) PCT Pub. No.: WO2022/202836
PCT Pub. Date: Sep. 29, 2022

(65) Prior Publication Data
US 2024/0157761 A1 May 16, 2024

(30) Foreign Application Priority Data
Mar. 24, 2021 (JP) .................. 2021-050560

(51) Int. Cl.
B60H 1/00 (2006.01)
(52) U.S. Cl.
CPC ................ B60H 1/00899 (2013.01)
(58) Field of Classification Search
CPC ............ B60H 1/00899; B60H 1/00921; B60H 1/3213; B60H 2001/00307; B60H 2001/00928; B60H 2001/00949; B60H 2001/3261; B60H 2001/3267; B60H 1/00278; F25B 5/04; F25B 6/04
See application file for complete search history.

(56) References Cited

FOREIGN PATENT DOCUMENTS

| CN | 112689570 A | * | 4/2021 | ......... B60H 1/00278 |
| DE | 112018006981 T5 | * | 10/2020 | ......... B60H 1/00328 |
| JP | 2004-182203 A | | 7/2004 | |
| JP | 2011-105150 A | | 6/2011 | |

(Continued)

OTHER PUBLICATIONS

Japan Patent Office, International Search Report issued in International Patent Application No. PCT/JP2022/013271, mailed May 24, 2022.

*Primary Examiner* — Kun Kai Ma
(74) *Attorney, Agent, or Firm* — Baker Botts L.L.P.

(57) ABSTRACT

A vehicle air conditioning apparatus includes: a refrigerant circuit including: a compressor; an outdoor heat exchanger; a heat releasing device; a first electronic expansion valve; a refrigerant-heat medium heat exchanger; and a second electronic expansion valve; a heat medium circuit; and a controller. The controller has heating modes including: an outdoor air heat absorption heating mode to absorb heat from the outdoor heat exchanger; and a waste heat recovery heating mode to absorb heat from the refrigerant-heat medium heat exchanger. When the outdoor air heat absorption heating mode is switched to the waste heat recovery heating mode, the controller controls the first electronic expansion valve to be closed, and controls a degree of superheat of the refrigerant to be increased on a downstream side of the refrigerant-heat medium heat exchanger.

20 Claims, 13 Drawing Sheets

(56) References Cited

FOREIGN PATENT DOCUMENTS

| | | |
|---|---|---|
| JP | 2018-140720 A | 9/2018 |
| JP | 2018-184108 A | 11/2018 |
| JP | 2019-209938 A | 12/2019 |
| JP | 2020-034228 A | 3/2020 |
| JP | 2020-050155 A | 4/2020 |

\* cited by examiner

VEHICLE AIR CONDITIONING APPARATUS

CROSS-REFERENCE TO RELATED APPLICATIONS

This application is a U.S. National Stage patent application under 37 U.S.C. § 371 of International Patent Application No. PCT/JP2022/013271, filed on Mar. 22, 2022, which claims the benefit of Japanese Patent Application No. JP 2021-050560, filed on Mar. 24, 2021, the disclosures of each of which are incorporated herein by reference in their entirety.

TECHNICAL FIELD

The present invention relates to a heat pump vehicle air conditioning apparatus applicable to a vehicle, and specifically to a vehicle air conditioning apparatus configured to heat a vehicle compartment using the heat absorbed from heat medium circulating through a heat medium circuit connected to a refrigerant circuit.

BACKGROUND ART

Conventionally, there has been known a heat pump vehicle air conditioning apparatus including refrigerant circuit in which a compressor, an indoor heat exchanger, an outdoor heat exchanger, and an expansion valve are connected, and configured to perform air conditioning in the vehicle compartment by supplying the vehicle compartment with the air having been subjected to a heat exchange with the refrigerant in the indoor heat exchanger.

As an example of the vehicle air conditioning apparatus, a battery temperature adjustment device as a heat medium circuit is provided in the refrigerant circuit via a refrigerant-heat medium heat exchanger to recover the heat of the battery, and the recovered heat is used for heating operation. For example, the vehicle air conditioning apparatus disclosed in Patent Literature 1 is configured to absorb the heat into the refrigerant for the heating operation in a plurality of modes including an outdoor air heat absorption mode performed by the outdoor heat exchanger, and a waste heat recovery mode performed by the refrigerant-heat medium heat exchanger, and these modes are switched according to need. These modes can be switched by dividing the flow of the refrigerant, or adjusting the amount of dividing the refrigerant flow with the use of an electronic expansion valve provided on the refrigerant inlet side of the outdoor heat exchanger and an electronic expansion valve provided on the refrigerant inlet side of the refrigerant-heat medium heat exchanger.

CITATION LIST

Patent Literature

PTL1: Japanese Patent Application Laid-Open No. 2018-184108

SUMMARY OF INVENTION

Problem to be Solved by the Invention

However, in a case where the outdoor air heat absorption mode is switched to the waste heat recovery mode during the heating operation, when the temperature of the heat medium circulating through the battery temperature adjustment device is higher than the outdoor air temperature, the refrigerant circulating through the refrigerant circuit on the low pressure side, that is, the refrigerant passing through the refrigerant-heat medium heat exchanger rapidly rises in pressure (temperature). In this case, control of the number of rotations of the compressor is not sufficiently effective, and the temperature of the air having blown out from the indoor heat exchanger and being supplied into the vehicle compartment may be fluctuated.

The present invention has been achieved in consideration of this circumstance, and it is therefore an object of the invention to prevent the fluctuation in the temperature of the air being supplied into the vehicle compartment and to keep the temperature constant when the heating mode is switched.

Solution to Problem

An aspect of the invention provides a vehicle air conditioning apparatus including: a refrigerant circuit including: a compressor configured to compress refrigerant; an outdoor heat exchanger configured to cause a heat exchange between the refrigerant and outdoor air; a heat releasing device configured to heat air supplied into a vehicle compartment; a first electronic expansion valve provided on a refrigerant inlet side of the outdoor heat exchanger; a refrigerant-heat medium heat exchanger; and a second electronic expansion valve provided on a refrigerant inlet side of the refrigerant-heat medium heat exchanger; a heat medium circuit configured to circulate heat medium to cause a heat exchange between the refrigerant and the heat medium in the refrigerant-heat medium heat exchanger; and a controller configured to control the refrigerant circuit and the heat medium circuit. During heating operation to heat the vehicle compartment by using the heat releasing device, the controller has heating modes including: an outdoor air heat absorption heating mode to absorb heat from the outdoor heat exchanger into the refrigerant discharged from the compressor and having released heat in the heat releasing device; and a waste heat recovery heating mode to absorb heat from the refrigerant-heat medium heat exchanger into the refrigerant discharged from the compressor and having released heat in the heat releasing device. When the outdoor air heat absorption heating mode is switched to the waste heat recovery heating mode, the controller controls the first electronic expansion valve to be closed, and controls a degree of superheat of the refrigerant to be increased on a downstream side of the refrigerant-heat medium heat exchanger.

Effect of the Invention

According to the invention, it is possible to prevent the fluctuation in the temperature of the air being supplied into the vehicle compartment and to keep the temperature constant when the heating mode is switched.

DESCRIPTION OF EMBODIMENTS

Hereinafter, an embodiment of the invention will be described in detail with reference to the drawings. In the description below, the same reference number in different drawings denotes the same component with the same function, and duplicate description for each of the drawings is omitted accordingly.

Figure 1:
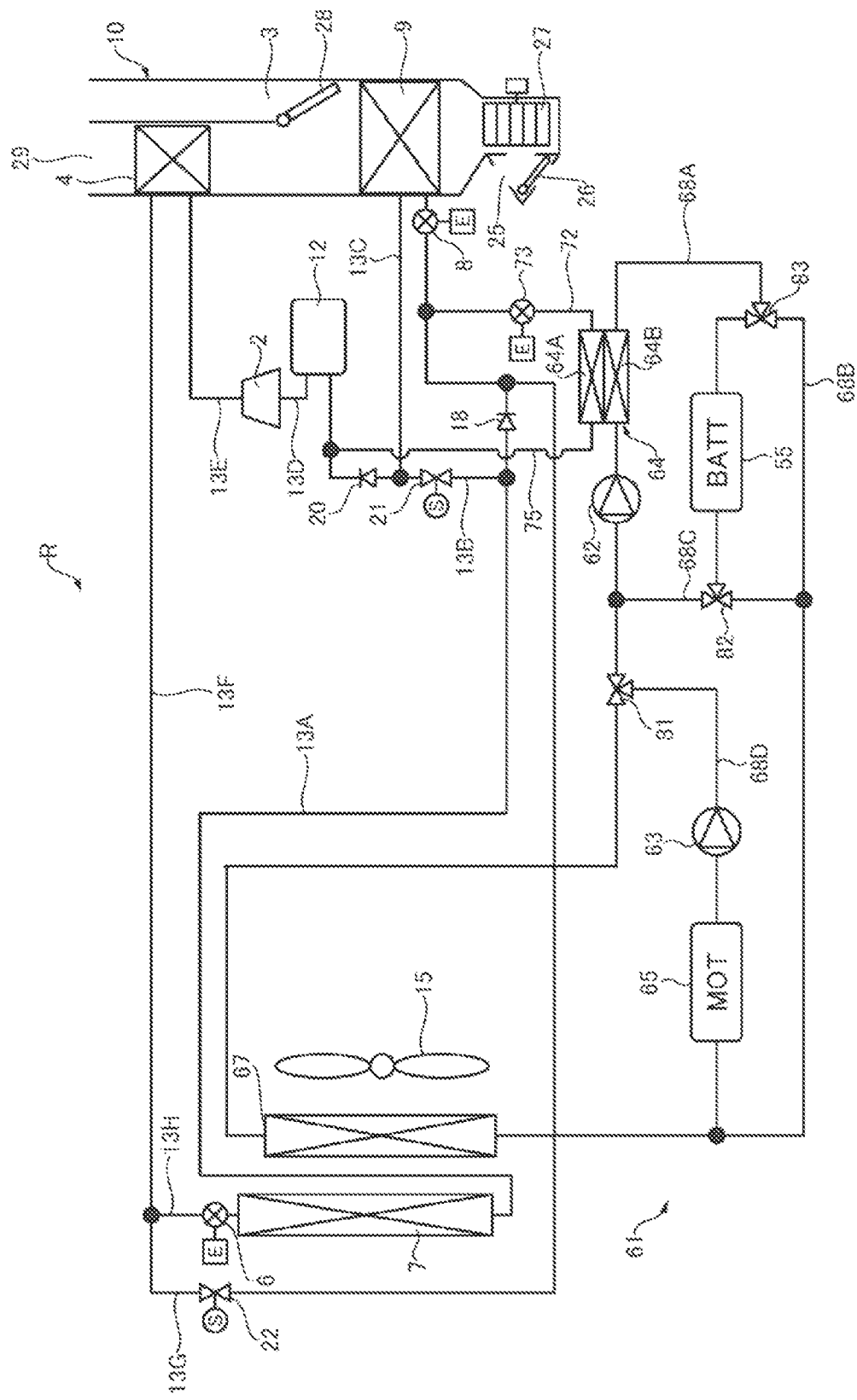
FIG. 1 illustrates a schematic configuration of a refrigerant circuit R of a vehicle air conditioning apparatus according to an embodiment of the invention.

FIG. 1 illustrates a schematic configuration of a vehicle air conditioning apparatus 1 according to an embodiment of the invention. The vehicle air conditioning apparatus 1 is applicable to vehicles, for example, an electric vehicle (EV) without an engine (internal combustion), and a so-called hybrid vehicle using an engine and an electric drive motor together. This vehicle includes a battery (e.g. a lithium battery), and is configured to drive and run by supplying the power of the battery charged by an external power source to a motor unit including the drive motor. Also the vehicle air conditioning apparatus 1 is driven by the power supplied from the battery.

The vehicle air conditioning apparatus 1 according to the present embodiment includes a refrigerant circuit R, and performs heat pump operation with use of the refrigerant circuit R to perform air conditioning (heating, cooling, dehumidifying, and defrosting) of a vehicle compartment. In addition, a device temperature adjustment circuit 61 as a heat medium circuit connected to the refrigerant circuit R is used to cool and warm up electric devices such as a battery 55 and a motor unit 65. Here, in the description below, "refrigerant" is circulating medium whose state varies (compressed, condensed, expanded, and evaporated) in a heat pump of the refrigerant circuit R, and "heat medium" is medium configured to absorb and release heat without varying its state.

The refrigerant circuit R includes: an electric motor-driven compressor 2 configured to compress refrigerant, an indoor condenser (heat releasing device) 4, as an indoor heat exchanger, provided in an air flow passage 3 of an HVAC unit 10 through which the air of the vehicle compartment is ventilated and circulated, and configured to release the heat from the refrigerant having a high temperature and a high pressure discharged from the compressor 2 and heat the air to be supplied into the vehicle compartment; an outdoor expansion valve 6 configured to decompress and expand the refrigerant during the heating; an outdoor heat exchanger 7 functioning as a heat releasing device (condenser) to release the heat from the refrigerant during the cooling, and configured to cause a heat exchange between the refrigerant and the outdoor air to function as an evaporator to absorb the heat into the refrigerant during the heating; an indoor expansion valve 8 configured to decompress and expand the refrigerant; a heat absorbing device 9 provided in the air flow passage 3 and configured to absorb the heat into the refrigerant from the inside and the outside of the vehicle compartment to cool the air to be supplied into the vehicle compartment during the cooling and the dehumidifying; and an accumulator 12, which are connected by refrigerant pipes 13A to 13H.

The outdoor expansion valve 6 and the indoor expansion valve 8 are electronic expansion valves driven by a pulse motor (not illustrated), and the degree of opening of them is appropriately controlled between the full closing and the full opening based on the number of pulses applied to the pulse motor. The outdoor expansion valve 6 decompresses and expands the refrigerant having flowed from the indoor condenser 4 and flowing into the outdoor heat exchanger 7. In addition, the degree of opening of the outdoor expansion valve 6 is controlled by a heat pump ECU 11 described later, so as to make a SC (sub-cooling) value as an indicator of the achievement of supercooling at the refrigerant outlet of the indoor condenser 4 attain to a predetermined target value (SC control). The indoor expansion valve 8 decompresses and expands the refrigerant flowing into the heat absorbing device 9, and adjusts the amount of heat being absorbed into the refrigerant in the heat absorbing device 9.

An outdoor blower 15 is provided in the outdoor heat exchanger 7. The outdoor blower 15 forcibly ventilates the outdoor heat exchanger 7 by the outdoor air to cause a heat exchange between the outdoor air and the refrigerant, and allows the outdoor heat exchanger 7 to be ventilated by the outdoor air even during the stop of the vehicle.

The refrigerant outlet of the outdoor heat exchanger 7 is connected to the refrigerant inlet of the heat absorbing device 9 by the refrigerant pipe 13A. A check valve 18 and the indoor expansion valve 8 are provided in the refrigerant pipe 13A in this order from the outdoor heat exchanger 7 side. The check valve 18 is provided in the refrigerant pipe 13A such that the direction toward the heat absorbing device 9 is the forward direction. The refrigerant pipe 13A branches into the refrigerant pipe 13B at a position on the outdoor heat exchanger 7 side rather than on the check valve 18 side.

The refrigerant pipe 13B branched from the refrigerant pipe 13A is connected to the refrigerant inlet of the accumulator 12. A solenoid valve 21 and a check valve 20 which are opened during the heating are provided in the refrigerant pipe 13B in this order from the outdoor heat exchanger 7 side. The check valve 20 is connected such that the direction toward the accumulator 12 is the forward direction. The refrigerant pipe 13B branches into the refrigerant pipe 13C between the solenoid valve 21 and the check valve 20. The refrigerant pipe 13C branched from the refrigerant pipe 13B is connected to the refrigerant outlet of the heat absorbing device 9. The refrigerant outlet of the accumulator 12 is connected to the compressor 2 by the refrigerant pipe 13D.

The refrigerant outlet of the compressor 2 is connected to the refrigerant inlet of the indoor condenser 4 by the refrigerant pipe 13E. One end of the refrigerant pipe 13F is connected to the refrigerant outlet of the indoor condenser 4, and the other end of the refrigerant pipe 13F branches into the refrigerant pipe 13G and the refrigerant pipe 13H upstream of the outdoor expansion valve 6 (with respect to the refrigerant flow). The refrigerant pipe 13H branched from the refrigerant pipe 13F is connected to the refrigerant inlet of the outdoor heat exchanger 7 via the outdoor expansion valve 6. Meanwhile, the refrigerant pipe 13G branched from the refrigerant pipe 13F is connected to the refrigerant pipe 13A between the check valve 18 and the indoor expansion valve 8. A solenoid valve 22 is provided in the refrigerant pipe 13G upstream from the connection point to the refrigerant pipe 13A with respect to the refrigerant flow.

By this means, the refrigerant pipe 13G is connected in parallel to a series circuit including the outdoor expansion valve 6, the outdoor heat exchanger 7 and the check valve 18, and forms a bypass circuit configured to bypass the outdoor expansion valve 6, the outdoor heat exchanger 7, and the check valve 18.

An outdoor air intake port and an indoor air intake port (representatively illustrated as "intake port 25" in FIG. 1) are formed upstream of the heat absorbing device 9 with respect to the air flow in the air flow passage 3. An intake switching damper 26 is provided in the intake port 25. The intake switching damper 26 appropriately switches between the indoor air which is the air in the vehicle compartment (indoor air circulation) and the outdoor air which is the air outside the vehicle compartment (outdoor air introduction) to introduce the air from the intake port 25 into the air flow passage 3. An indoor blower (blower fan) 27 is provided downstream of the intake switching damper 26 with respect to the air flow, and configured to supply the introduced indoor air and outdoor air to the air flow passage 3.

An auxiliary heater (not illustrated) is provided in the air flow passage 3 downstream of the indoor condenser 4 with respect to the air flow of the air flow passage 3. The auxiliary heater is an electric heater such as a PTC heater, and is turned on and generates heat to supplement the heating in the vehicle compartment.

An air mix damper 28 is provided upstream of the indoor condenser 4 with respect to the air flow in the air flow passage 3, and configured to adjust the ratio between indoor condenser 4 and the auxiliary heater 23 through which the air (the indoor air and the outdoor air) having flowed into the air flow passage 3 and passed through the heat absorbing device 9 is ventilated. Here, as auxiliary heating means, for example, it may circulate hot water heated by the waste heat of the compressor through a heater core disposed in the air flow passage 3 to heat the air to be sent.

A refrigerant-heat medium heat exchanger 64 is connected to the refrigerant circuit R. The refrigerant-heat medium heat exchanger 64 includes a refrigerant flow path 64A and a heat medium flow path 64B, and constitutes part of the refrigerant circuit R and also part of the device temperature adjustment circuit 61 as a heat medium circuit.

To be more specific, the refrigerant-heat medium heat exchanger 64 is connected to the refrigerant circuit R as follows. One end of a refrigerant pipe 72 as a branching circuit is connected to the refrigerant circuit R downstream of the check valve 18 provided in the refrigerant pipe 13A and upstream of the indoor expansion valve 8 with respect to the refrigerant flow. The other end of the refrigerant pipe 72 is connected to the inlet of the refrigerant flow path 64A of the refrigerant-heat medium heat exchanger 64. A chiller expansion valve 73 is provided in the refrigerant pipe 72.

The chiller expansion valve 73 is an electronic expansion valve driven by a pulse motor (not illustrated), and has the degree of opening which is appropriately controlled between the full closing and the full opening based on the number of pulses applied to the pulse motor. The chiller expansion valve 73 decompresses and expands the refrigerant flowing into the refrigerant flow path 64A of the refrigerant-heat medium heat exchanger 64, and adjusts the degree of superheat of the refrigerant on the downstream side of the refrigerant flow path 64A of the refrigerant-heat medium heat exchanger 64.

One end of a refrigerant pipe 75 is connected to the outlet of the refrigerant flow path 64A of the refrigerant-heat medium heat exchanger 64. The other end of the refrigerant pipe 75 is connected to the refrigerant pipe 13B between the check valve 20 and the accumulator 12. In this way, the chiller expansion valve 73, and the refrigerant flow path 64A of the refrigerant-heat medium heat exchanger 64 constitute part of the refrigerant circuit R.

The refrigerant circulating through the refrigerant circuit R is subjected to a heat exchange with the heat medium circulating through the device temperature adjustment circuit 61 by the refrigerant-heat medium heat exchanger 64. The device temperature adjustment circuit 61 adjusts the temperatures of temperature-adjusted subjects such as the battery 55 and the motor unit 65 by circulating the heat medium through the battery 55 and the motor unit 65. Here, the motor unit 65 includes an electric drive motor, and a heat generating device such as an inverter circuit to drive the electric motor. As a temperature-adjusted subject, a heat generating device mounted in the vehicle is applicable, in addition to the battery 55 and the motor unit 65.

The device temperature adjustment circuit 61 includes a first circulating pump 62 and a second circulating pump 63 as circulating devices to circulate the heat medium in the battery 55 and the motor unit 65, an air-heat medium heat exchanger 67, three-way valves 81, 82 and 83 as a flow path switching devices, and these components are connected by heat medium pipes 68A to 68D.

In the refrigerant-heat medium heat exchanger 64, one end of the heat medium pipe 68A is connected to one side of the heat medium flow path 64B from which the heat medium is discharged, and the other end of the heat medium pipe 68A is connected to the heat medium inlet. The three-way valve 83, the battery 55, the three-way valve 82, the air-heat medium heat exchanger 67, the three-way valve 81, and the first circulating pump 62 are provided in the heat medium pipe 68A in this order from one side of the refrigerant-heat medium heat exchanger 64 from which the heat medium is discharged. In this way, the heat medium flow path 64B of the refrigerant-heat medium heat exchanger 64 constitutes part of the device temperature adjustment circuit 61. One end of the heat medium pipe 68B bypassing the battery 55 is connected to the heat medium pipe 68A downstream of the three-way valve 83 with respect to the heat medium flow, and the other end of the heat medium pipe 68B is connected to the heat medium pipe 68A downstream from the three-way valve 82 with respect to the heat medium flow.

One end of the heat medium pipe 68C is provided on one side of the three-way valve 82 opposite to the heat medium pipe 68B, and the other end of the heat medium pipe 68C is connected to the heat medium pipe 68A between the first circulating pump 62 and the three-way valve 81.

One end of the heat medium pipe 68D is connected to the heat medium pipe 68A between the three-way valve 82 and the air-heat medium heat exchanger 67, and the other end of the heat medium pipe 68D is connected to the heat medium pipe 68A upstream from the first circulating pump 62 with respect to the heat medium flow. The motor unit 65 and the second circulating pump 63 are provided in the heat medium pipe 68D in the order from the upstream of the heat medium flow. With this configuration of the device temperature adjustment circuit 61, by controlling the three-way valves 81, 82 and 83, the heat medium is circulated only in the battery 55, only in the motor unit 65, or both in the battery 55 and the motor unit 65 in the device temperature adjustment circuit 61. By this means, it is possible to adjust the temperatures of the battery 55 and the motor unit 65.

As the heat medium used in the device temperature adjustment circuit 61, for example, water, refrigerant such as HFO-1234yf, liquid such as coolant, and gas such as air may be adopted. Here, with the present embodiment, coolant is adopted as the heat medium. In addition, for example, a jacket structure is applied to the periphery of the battery 55 and the motor unit 65, so that heat medium can flow through the jacket structure while a heat exchange with the battery 55 and the motor unit 65 is performed.

When the chiller expansion valve 73 is open, part or the whole of the refrigerant having flowed from the refrigerant pipe 13G and the outdoor heat exchanger 7 flows into the refrigerant pipe 72, is decompressed by the chiller expansion valve 73, flows into the refrigerant flow path 64A of the refrigerant-heat medium heat exchanger 64, and evaporates. On the other hand, the heat medium having circulated through the device temperature adjustment circuit 61 and absorbed the heat from the battery 55 and the motor unit 65 flows into the heat medium flow path 64B of the refrigerant-heat medium heat exchanger 64. While flowing through the refrigerant flow path 64A of the refrigerant-heat medium heat exchanger 64, the refrigerant absorbs the heat from the heat medium flowing through the heat medium flow path 64B, and then passes through the accumulator 12 and is sucked into the compressor 2.

Figure 2:
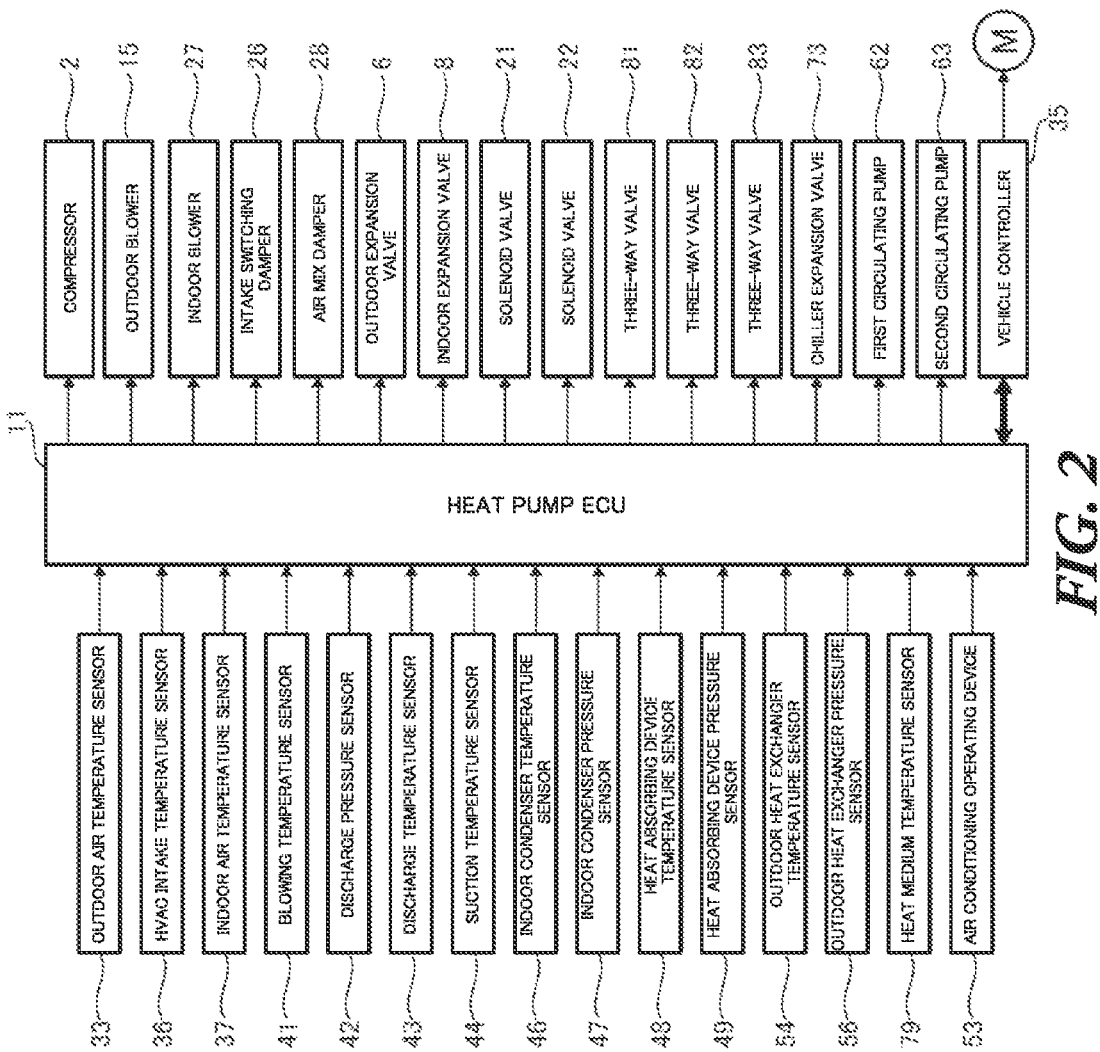
FIG. 2 is a block diagram illustrating a schematic configuration of a heat pump ECU as a controller of the vehicle air conditioning apparatus according to the embodiment of the invention.

FIG. 2 illustrates a schematic configuration of the heat pump ECU 11 as a controller of the vehicle air conditioning apparatus 1. The heat pump ECU 11 is connected to a vehicle controller 35 for the general control of the vehicle including the control of driving, via an in-vehicle network such as a CAN (controller area network) and a LIN (local interconnect network), and therefore can communicate with one another, and send and receive information. A microcomputer as an example of a computer with a processor is applicable to each of the heat pump ECU 11 and the vehicle controller 35.

Various sensors and detectors are connected to the heat pump ECU 11 as follows, and outputs of these sensors and detectors are inputted to the heat pump ECU 11. To be more specific, the heat pump ECU 11 is connected to an outdoor air temperature sensor 33 configured to detect outdoor air temperature Tam of the vehicle; an HVAC intake temperature sensor 36 configured to detect the temperature of the air taken from the intake port 25 into the air flow passage 3; an indoor air temperature sensor 37 configured to detect temperature Tin of the air in the vehicle compartment; a blowing temperature sensor 41 configured to detect the temperature of the air blowing out from a blowing outlet 29 to the vehicle compartment; a discharge pressure sensor 42 configured to detect the pressure of the refrigerant discharged from the compressor 2 (discharge pressure Pd); a discharge temperature sensor 43 configured to detect discharged refrigerant temperature Td of the compressor 2; a suction temperature sensor 44 configured to detect sucked refrigerant temperature Ts of the compressor 2; an indoor condenser temperature sensor 46 configured to detect temperature TCI of the indoor condenser 4; an indoor condenser pressure sensor 47 configured to detect the pressure of the indoor condenser 4 (the pressure of the refrigerant just after exiting from the indoor condenser 4: indoor condenser exit pressure Pci); a heat absorbing device temperature sensor 48 configured to detect temperature Te of the heat absorbing device 9; a heat absorbing device pressure sensor 49 configured to detect the refrigerant pressure of the heat absorbing device 9; an air conditioning operating device 53 configured to set the preset temperature and the switching of the air conditioning operation; an outdoor heat exchanger temperature sensor 54 configured to detect temperature TXO of the outdoor heat exchanger 7; an outdoor heat exchanger pressure sensor 56 configured to detect refrigerant pressure PXO of the outdoor heat exchanger 7; and a heat medium temperature sensor 79 configured to detect temperature Tw (hereinafter, referred to as "chiller water temperature") of the heat medium having exited from the heat medium flow path 64B of the refrigerant-heat medium heat exchanger 64 and circulating through the heat medium circuit.

On the other hand, the output of the heat pump ECU 11 is connected to the compressor 2, the outdoor blower 15, the indoor blower (blower fan) 27, the intake switching damper 26, the air mix damper 28, the outdoor expansion valve 6, the indoor expansion valve 8, the solenoid valves 21 and 22, the three-way valves 81, 82, and 83, the chiller expansion valve 73, the first circulating pump 62, and the second circulating pump 63. The heat pump ECU 11 controls these components based on the output of each of the sensors, the setting inputted by the air conditioning operating device 53, and the information from the vehicle controller 35.

Hereinafter, actions during the heating operation of the vehicle air conditioning apparatus 1 having the configuration as described above will be described. The heat pump ECU 11 (controller) according to the present embodiment switchably performs an outdoor air heat absorption heating mode to absorb heat by the outdoor heat exchanger 7 only and a waste heat recovery heating mode to absorb heat by the refrigerant-heat medium heat exchanger 64 only during the heating operation. In addition, when the outdoor air heat absorption heating mode is switched to the waste heat recovery heating mode, the heat is absorbed in both the outdoor heat exchanger 7 and the refrigerant-heat medium heat exchanger 64. Therefore, the vehicle air conditioning apparatus according to the present embodiment can perform three heating modes including the outdoor air heat absorption heating mode, the waste heat recovery heating mode, and a combination heating mode. Hereinafter, each of the heating modes will be described.

(1) Outdoor Air Heat Absorption Heating Mode (MODE 1)

Figure 3:
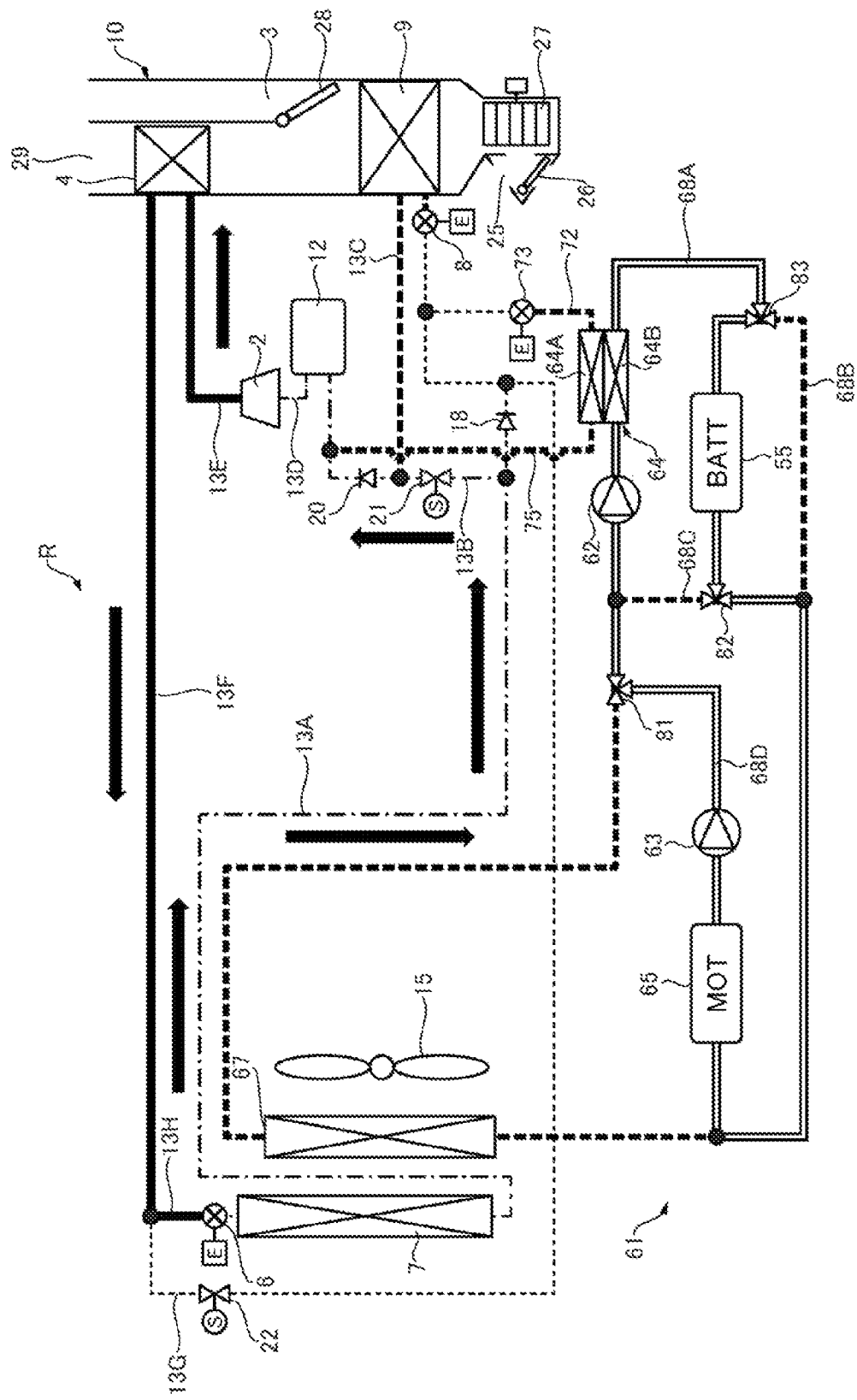
FIG. 3 illustrates the flow of refrigerant in the refrigerant circuit R in an outdoor air heat absorption heating mode of the vehicle air conditioning apparatus according to the embodiment of the invention.

FIG. 3 illustrates the refrigerant flow (arrows) in the refrigerant circuit R in the outdoor air heat absorption heating mode. The heating operation is selected by the heat pump ECU 11 (automatic mode) or by manually operating the air conditioning operating device 53 (manual mode). When the heat pump ECU 11 performs the outdoor air heat absorption heating mode, the solenoid valve 21 is opened, and indoor expansion valve 8 is fully closed. In addition, the chiller expansion valve 73 and the solenoid valve 22 are fully closed.

The compressor 2 and the indoor blower 27 are actuated, and the air mix damper 28 is placed in a state to adjust the ratio between the indoor condenser 4 and an auxiliary heater (not illustrated) through which the air blowing out from the indoor blower 27 is ventilated. By this means, gas refrigerant having a high temperature and a high pressure discharged from the compressor 2 flows into the indoor condenser 4. The indoor condenser 4 is ventilated by the air in the air flow passage 3, and therefore the air in the air flow passage 3 is heated by the refrigerant having a high temperature in the indoor condenser 4, and meanwhile, the heat of the refrigerant in the indoor condenser 4 is removed by the air, and therefore the refrigerant is cooled and consequently condensed and liquefied.

The refrigerant liquefied in the indoor condenser 4 exits from the indoor condenser 4, and then passes through the refrigerant pipes 13F and 13H, and reaches the outdoor expansion valve 6. The refrigerant is decompressed by the outdoor expansion valve 6, and then flows into the outdoor heat exchanger 7. The refrigerant having flowed into the outdoor heat exchanger 7 evaporates, and absorbs the heat from the outdoor air flowing from the outside while the vehicle is moving, or the outdoor air ventilated by the outdoor blower 15. That is, the refrigerant circuit R serves as a heat pump.

Then, the refrigerant with a low temperature and a low pressure having exited from the outdoor heat exchanger 7 passes through the refrigerant pipes 13A and 13B, the solenoid valve 21, and the check valve 20, and flows into the accumulator 12. The refrigerant is separated into gas and liquid in the accumulator 12, and then gas refrigerant passes through the refrigerant pipe 13D and is sucked into the compressor 2. This circulation of the refrigerant is repeated. The air heated in the indoor condenser 4 blows out from the blowing outlet 29. By this means, the vehicle compartment is heated.

The heat pump ECU 11 calculates target indoor condenser pressure PCO (the target value of the pressure PCI of the indoor condenser 4) from target blowing temperature TAO;

controls the number of rotations of the compressor 2, based on the target indoor condenser pressure PCO, and the refrigerant pressure of the indoor condenser 4 (the indoor condenser pressure Pci, that is, the refrigerant pressure on the high-pressure side of the refrigerant circuit R) detected by the indoor condenser pressure sensor 47;

controls the degree of opening of the outdoor expansion valve 6, based on the temperature of the indoor condenser 4 (indoor condenser temperature TCI) detected by the indoor condenser temperature sensor 46, and the indoor condenser pressure Pci detected by the indoor condenser pressure sensor 47; and controls the degree of supercooling of the refrigerant at the exit of the indoor condenser 4. In addition, when the heating performance of the indoor condenser 4 is insufficient, an auxiliary heater (not illustrated) is turned on to generate heat, so that the heating is supplemented.

(2) Waste Heat Recovery Heating Mode (MODE 2)

Figure 4:
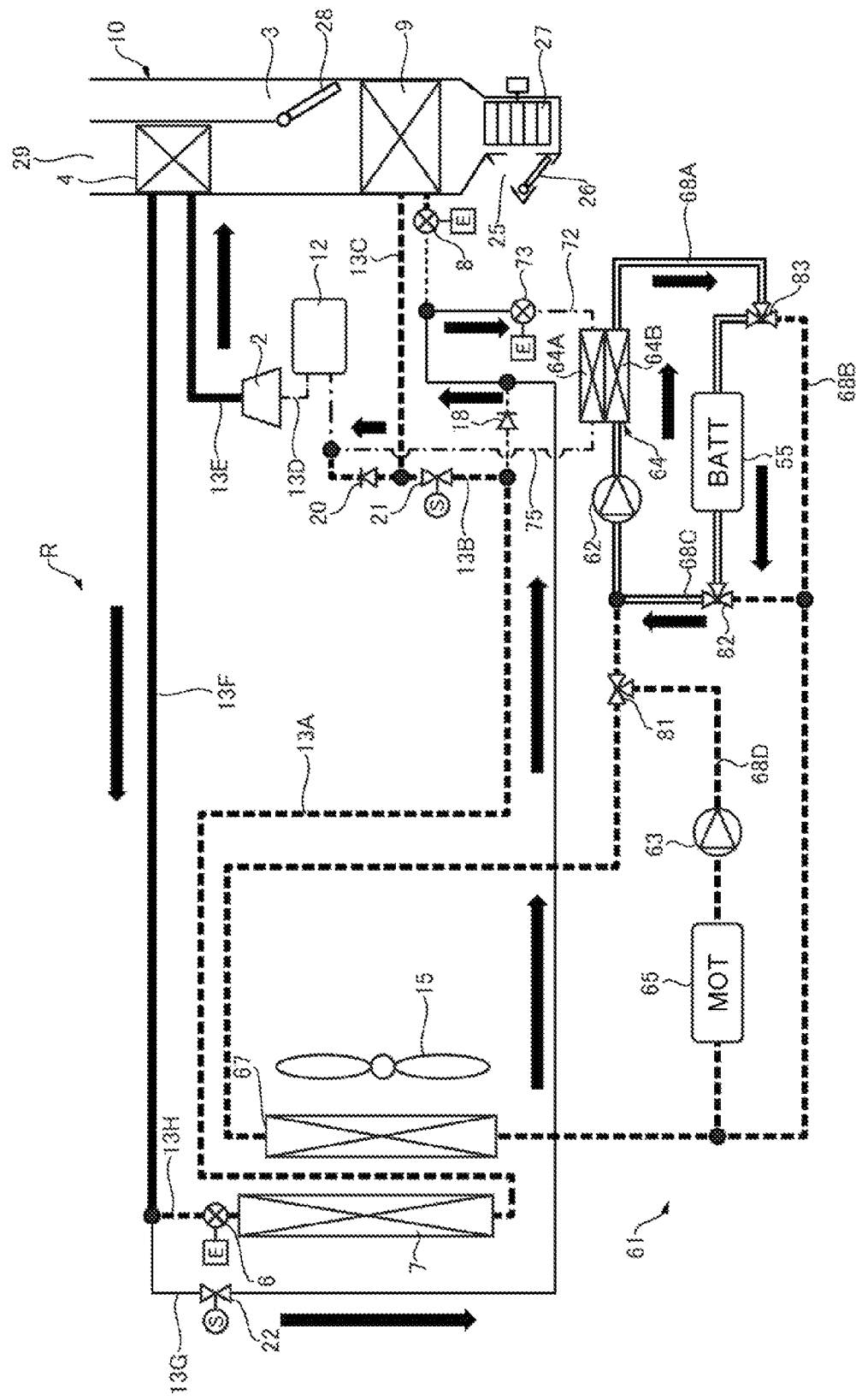
FIG. 4 illustrates the flow of the refrigerant in the refrigerant circuit R, and the flow of heat medium when the temperature of a battery is adjusted in a device temperature adjustment circuit in a waste heat recovery heating mode of the vehicle air conditioning apparatus according to the embodiment of the invention.
Figure 5:
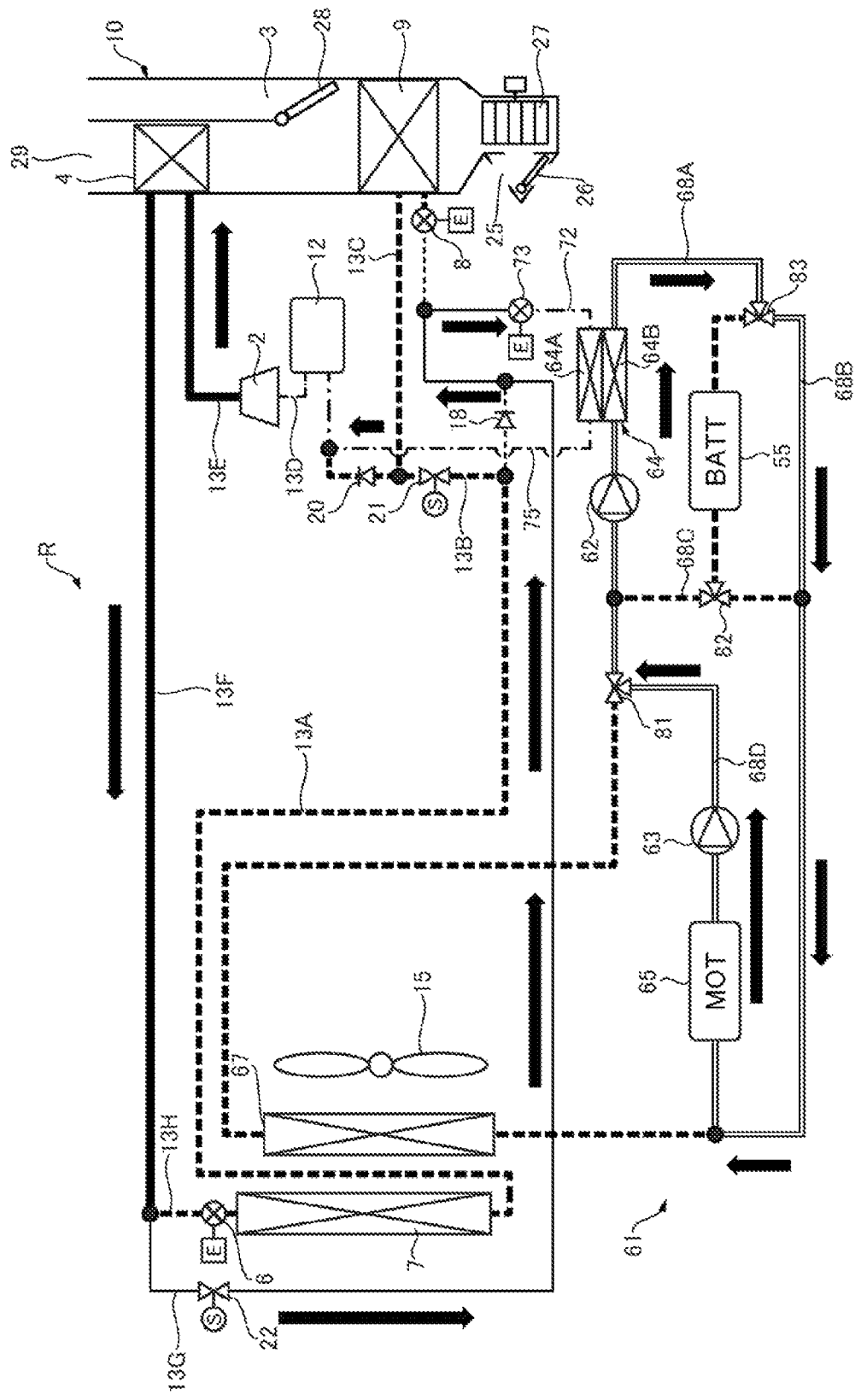
FIG. 5 illustrates the flow of the refrigerant in the refrigerant circuit R, and the flow of the heat medium when the temperature of a motor unit is adjusted in the device temperature adjustment circuit in the waste heat recovery heating mode of the vehicle air conditioning apparatus according to the embodiment of the invention.
Figure 6:
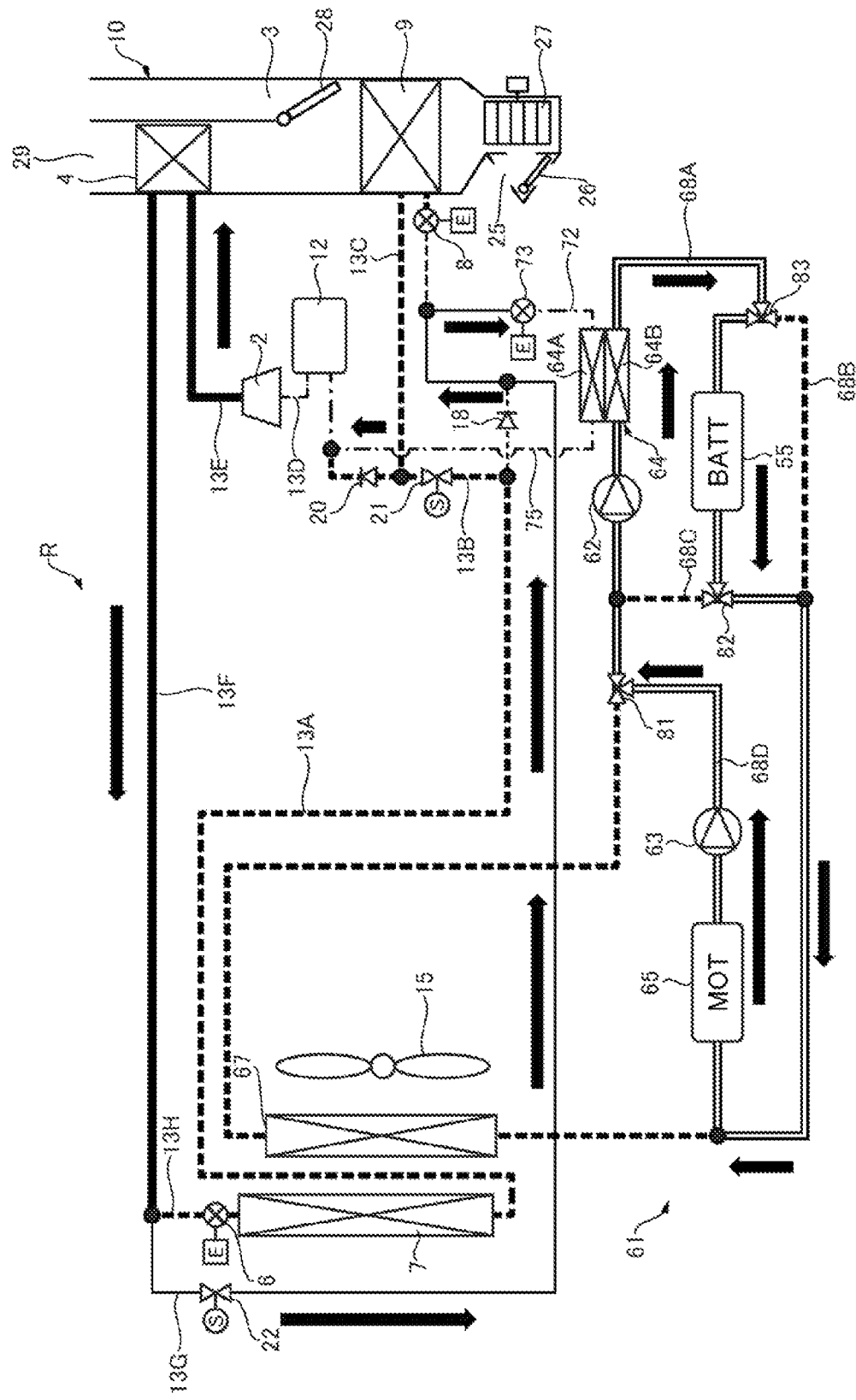
FIG. 6 illustrates the flow of the refrigerant in the refrigerant circuit R, and the flow of the heat medium when the temperatures of the battery and the motor unit are adjusted in the device temperature adjustment circuit in the waste heat recovery heating mode of the vehicle air conditioning apparatus according to the embodiment of the invention.

FIG. 4 to FIG. 6 illustrate the flow of the refrigerant in the refrigerant circuit R and the flow of the heat medium in the device temperature adjustment circuit 61 in the waste heat recovery heating mode. In the waste heat recovery heating mode, the heat pump ECU 11 closes the solenoid valve 21, fully closes the outdoor expansion valve 6 and the indoor expansion valve 8, and opens the solenoid valve 22. In addition, the chiller expansion valve 73 is opened and the degree of opening of the chiller expansion valve 73 is controlled. The compressor 2 and the indoor blower 27 are actuated.

By this means, all the refrigerant having exited from the indoor condenser 4 flows into the solenoid valve 22, passes through the refrigerant pipe 13G, and flows into the refrigerant pipe 72. The refrigerant passes the refrigerant pipe 72, is decompressed by the chiller expansion valve 73, and then passes through the refrigerant pipe 72, flows into the refrigerant flow path 64A of the refrigerant-heat medium heat exchanger 64, and evaporates. At this time, the refrigerant exhibits heat absorption effect. The refrigerant having evaporated in the refrigerant flow path 64A passes through the refrigerant pipe 75, flows into the refrigerant pipe 13B downstream of the check valve 20, passes through the accumulator 12 and the refrigerant pipe 13D, and is sucked into the compressor 2. This circulation of the refrigerant is repeated.

On the other hand, in the device temperature adjustment circuit 61, there are three cases: a case where the temperature of the battery 55 is adjusted to recover the heat from the battery 55 (FIG. 4); a case where the temperature of the motor unit 65 is adjusted to recover the heat from the motor unit 65 (FIG. 5); and a case where the temperatures of the battery 55 and the motor unit 65 are adjusted to recover the heat from both the battery 55 and the motor unit 65 (FIG. 6).

In the case illustrated in FIG. 4 where the heat is recovered from the battery 55, the heat medium is circulated by the first circulating pump 62, passes through the three-way valve 83, flows into the battery 55, is subjected to a heat exchange in the battery 55, and then passes through the three-way valve 82, flows into the heat medium pipe 68C, passes through the heat medium pipe 68A, and reaches the heat medium flow path 64B of the refrigerant-heat medium heat exchanger 64. The heat of the heat medium is absorbed into the refrigerant evaporating in the refrigerant flow path 64A of the refrigerant-heat medium heat exchanger 64, and therefore the heat medium is cooled. The heat medium cooled by the heat absorption effect of the refrigerant exits from the refrigerant-heat medium heat exchanger 64, and flows into the battery 55 again. This circulation of the heat medium is repeated by the first circulating pump 62.

In the case illustrated in FIG. 5 where the heat is recovered from the motor unit 65, the heat medium is circulated by the first circulating pump 62 and the second circulating pump 63, passes through the three-way valve 83, flows into the motor unit 65, is subjected to a heat exchange in the motor unit 65, and then passes through the heat medium pipe 68D, three-way valve 81 and the heat medium pipe 68A, and reaches the heat medium flow path 64B of the refrigerant-heat medium heat exchanger 64. The heat of the heat medium is absorbed into the refrigerant evaporating in the refrigerant flow path 64A of the refrigerant-heat medium heat exchanger 64, and therefore the heat medium is cooled. The heat medium cooled by the heat absorption effect of the refrigerant exits from the refrigerant-heat medium heat exchanger 64, passes through the heat medium pipe 68A, the three-way valve 83, the heat medium pipe 68B, and the heat medium pipe 68D, and flows into the motor unit 65 again. This circulation of the heat medium is repeated by the first circulating pump 62 and the second circulating pump 63.

In the case illustrated in FIG. 6 where the heat is recovered from both the battery 55 and the motor unit 65, the heat medium is circulated by the first circulating pump 62 and the second circulating pump 63, passes through the three-way valve 83, is subjected to a heat exchange in the battery 55, and then passes through the three-way valve 82 and the heat medium pipe 68D, and is further subjected to a heat exchange in the motor unit 65.

After that, the heat medium is sucked into the second circulating pump 63 in the heat medium pipe 68D, passes through the three-way valve 81 and the heat medium pipe 68A, and reaches the heat medium flow path 64B of the refrigerant-heat medium heat exchanger 64. The heat of the heat medium is absorbed into the refrigerant evaporating in the refrigerant flow path 64A of the refrigerant-heat medium heat exchanger 64, and therefore the heat medium is cooled. The heat medium cooled by the heat absorption effect of the refrigerant exits from the refrigerant-heat medium heat exchanger 64, passes through the heat medium pipe 68A, and the three-way valve 83, and flows into the battery 55 again. This circulation of the heat medium is repeated by the first circulating pump 62 and the second circulating pump 63.

In this way, in the waste heat recovery heating mode, the refrigerant in the refrigerant circuit R evaporates in the refrigerant-heat medium heat exchanger 64 and absorbs the heat from the heat medium only in the device temperature adjustment circuit 61. In other words, the refrigerant does not flow into the outdoor heat exchanger 7 and evaporate, but draws the heat from the battery 55 or the motor unit 65, or both the battery 55 and the motor unit 65 via the heat medium. Therefore, it is possible to cool the battery 55 and the motor unit 65 while solving the problem of frost formation on the outdoor heat exchanger 7, and to carry the heat drawn from the battery 55 and the motor unit 65 (temperature-adjusted subjects) to the indoor condenser 4, and therefore to heat the vehicle compartment.

(3) Combination Heating Mode (Waste Heat Recovery Parallel Mode) (MODE 3)

Figure 7:
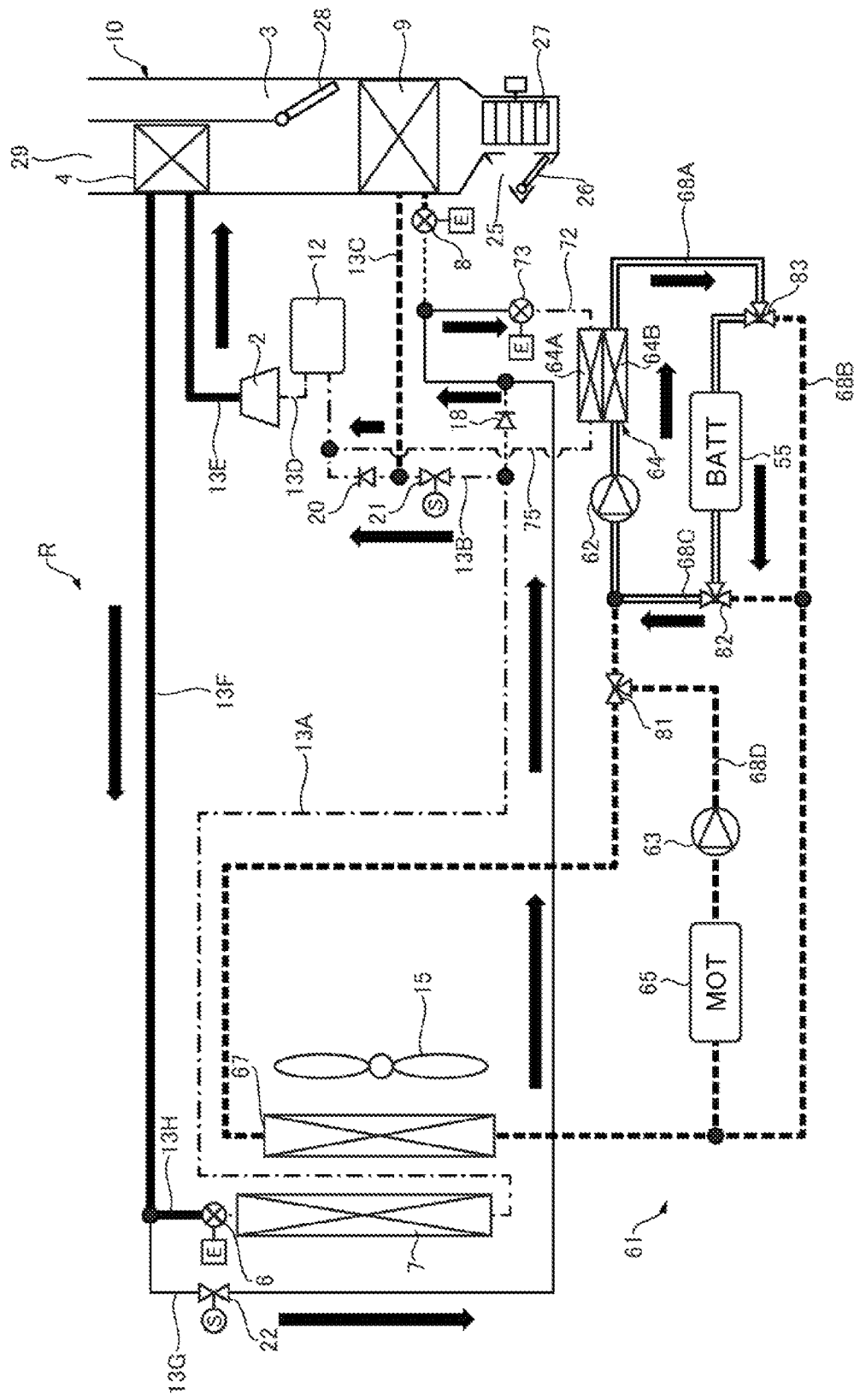
FIG. 7 illustrates the flow of the refrigerant in the refrigerant circuit R, and the flow of the heat medium when the temperature of the battery is adjusted in the device temperature adjustment circuit in a combination heating mode of the vehicle air conditioning apparatus according to the embodiment of the invention.
Figure 8:
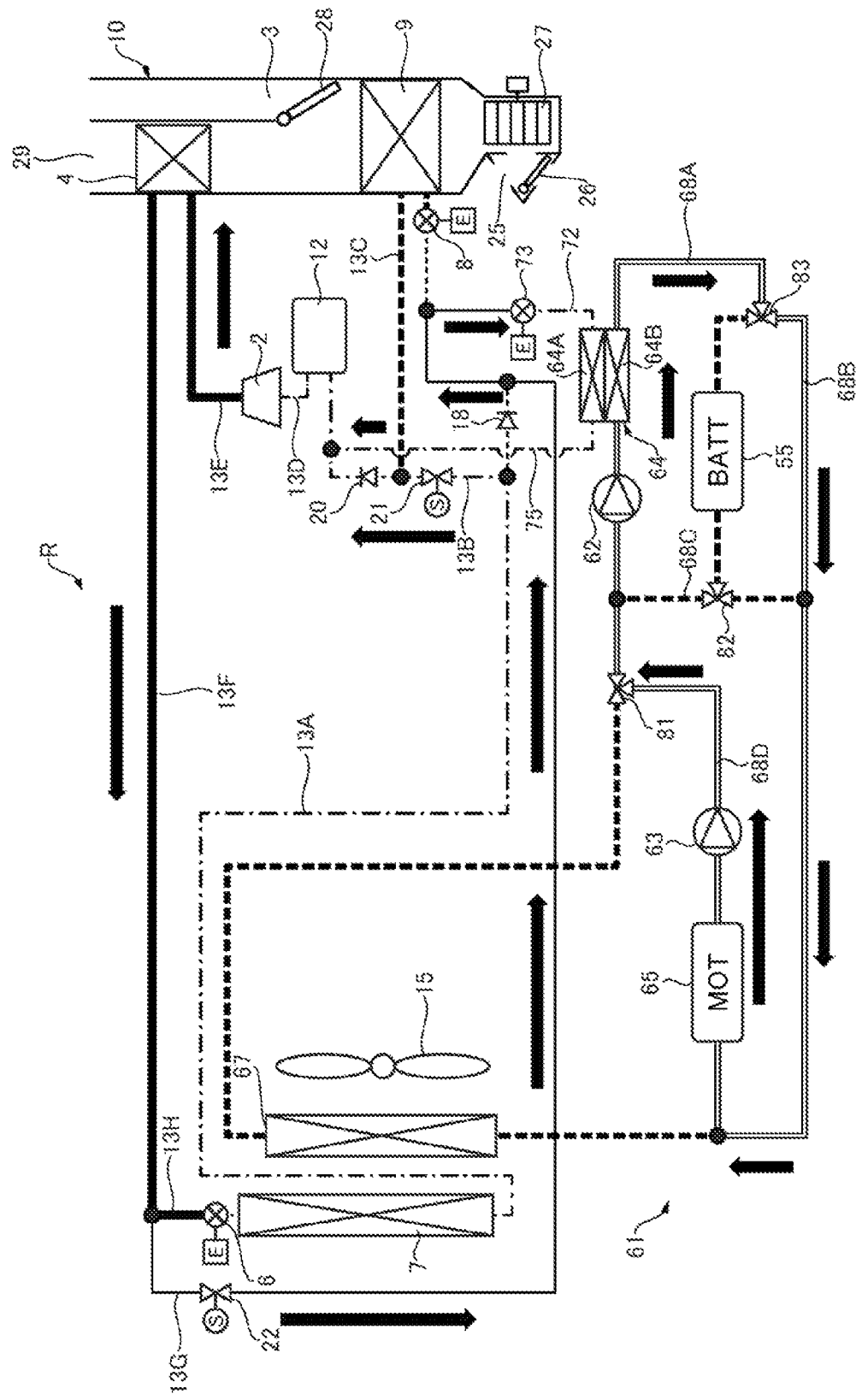
FIG. 8 illustrates the flow of the refrigerant in the refrigerant circuit R, and the flow of the heat medium when the temperature of the motor unit is adjusted in the device temperature adjustment circuit in the combination heating mode of the vehicle air conditioning apparatus according to the embodiment of the invention.
Figure 9:
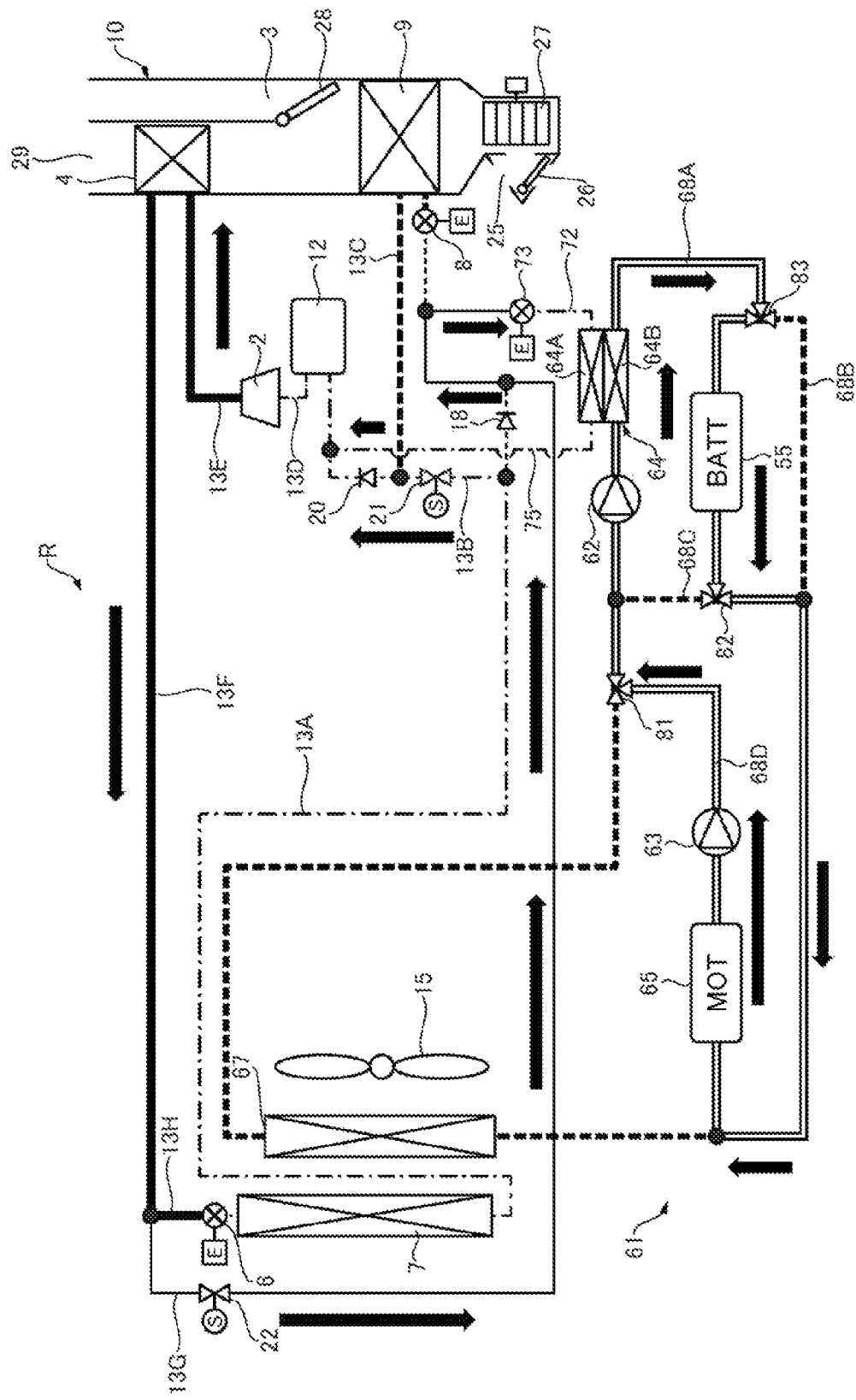
FIG. 9 illustrates the flow of the refrigerant in the refrigerant circuit R, and the flow of the heat medium when the temperatures of the battery and the motor unit are adjusted in the device temperature adjustment circuit in the combination heating mode of the vehicle air conditioning apparatus according to the embodiment of the invention.

FIG. 7 to FIG. 9 illustrate the flow of the refrigerant in the refrigerant circuit R and the flow of the heat medium in the device temperature adjustment circuit 61 in the combination heating mode. In the combination heating mode, from the state of the refrigerant circuit R in the outdoor air heat absorption heating mode of the heating operation illustrated in FIG. 3, the heat pump ECU 11 additionally opens the solenoid valve 22 and the chiller expansion valve 73, and controls the degrees of opening of the solenoid valve 22 and the chiller expansion valve 73. By this means, part of the refrigerant having exited from the indoor condenser 4 is divided upstream of the outdoor expansion valve 6 with respect to the refrigerant flow, passes through the refrigerant pipe 13G, and flows into the refrigerant pipe 72.

The refrigerant having flowed into the refrigerant pipe 72 is decompressed in the chiller expansion valve 73, and then passes through the refrigerant pipe 72, flows into the refrigerant flow path 64A of the refrigerant-heat medium heat exchanger 64, and evaporates. At this time, the refrigerant exhibits the heat absorption effect. The refrigerant having evaporated in the refrigerant flow path 64A passes through the refrigerant pipe 75, flows into the refrigerant pipe 13B downstream of the check valve 20, passes through the accumulator 12 and the refrigerant pipe 13D, and is sucked into the compressor 2. This circulation of the refrigerant is repeated.

On the other hand, in the device temperature adjustment circuit 61, there are three cases: a case where the temperature of the battery 55 is adjusted to recover the heat from the battery 55 (FIG. 7); a case where the temperature of the motor unit 65 is adjusted to recover the heat from the motor unit 65 (FIG. 8); and a case where the temperatures of the battery 55 and the motor unit 65 are adjusted to recover the heat from both the battery 55 and the motor unit 65 (FIG. 9), in the same way as the waste heat recovery heating mode described above.

In the case illustrated in FIG. 7 where the heat is recovered from the battery 55, the heat medium is circulated by the first circulating pump 62, passes through the three-way valve 83, flows into the battery 55, is subjected to a heat exchange in the battery 55, and then passes through the three-way valve 82, flows into the heat medium pipe 68C, passes through the heat medium pipe 68A, and reaches the heat medium flow path 64B of the refrigerant-heat medium heat exchanger 64. The heat of the heat medium is absorbed into the refrigerant evaporating in the refrigerant flow path 64A of the refrigerant-heat medium heat exchanger 64, and therefore the heat medium is cooled. The heat medium cooled by the heat absorption effect of the refrigerant exits from the refrigerant-heat medium heat exchanger 64, and flows into the battery 55 again. This circulation of the heat medium is repeated by the first circulating pump 62.

In the case illustrated in FIG. 8 where the heat is recovered from the motor unit 65, the heat medium is circulated by the first circulating pump 62 and the second circulating pump 63, passes through the three-way valve 83, flows into the motor unit 65, is subjected to a heat exchange in the motor unit 65, and then passes through the heat medium pipe 68D, three-way valve 81, and the heat medium pipe 68A, and reaches the heat medium flow path 64B of the refrigerant-heat medium heat exchanger 64. The heat of the heat medium is absorbed into the refrigerant evaporating in the refrigerant flow path 64A of the refrigerant-heat medium heat exchanger 64, and therefore the heat medium is cooled. The heat medium cooled by the heat absorption effect of the refrigerant exits from the refrigerant-heat medium heat exchanger 64, passes through the heat medium pipe 68A, the three-way valve 83, the heat medium pipe 68B, and the heat medium pipe 68D, and flows into the motor unit 65 again. This circulation of the heat medium is repeated by the first circulating pump 62 and the second circulating pump 63.

In the case illustrated in FIG. 9 where the heat is recovered from both the battery 55 and the motor unit 65, the heat medium is circulated by the first circulating pump 62 and the second circulating pump 63, passes through the three-way valve 83, is subjected to a heat exchange in the battery 55, and then passes through the three-way valve 82 and the heat medium pipe 68D, and is further subjected to a heat exchange in the motor unit 65. After that, the heat medium is sucked into the second circulating pump 63 in the heat medium pipe 68D, passes through the three-way valve 81 and the heat medium pipe 68A, and reaches the heat medium flow path 64B of the refrigerant-heat medium heat exchanger 64. The heat of the heat medium is absorbed into the refrigerant evaporating in the refrigerant flow path 64A of the refrigerant-heat medium heat exchanger 64, and therefore the heat medium is cooled. The heat medium cooled by the heat absorption effect of the refrigerant exits from the refrigerant-heat medium heat exchanger 64, passes through the heat medium pipe 68A, and the three-way valve 83, and flows into the battery 55 again. This circulation of the heat medium is repeated by the first circulating pump 62 and the second circulating pump 63.

In this way, in the combination heating mode, the outdoor heat exchanger 7 and the refrigerant-heat medium heat exchanger 64 are connected in parallel with respect to the refrigerant flow of the refrigerant circuit R. Therefore, the refrigerant flows into the outdoor heat exchanger 7 and the refrigerant-heat medium heat exchanger 64 and evaporates in each of them. Consequently, the heat is absorbed from the outdoor air by the outdoor heat exchanger 7 and also from the heat medium by the refrigerant-heat medium heat exchanger 64. By this means, it is possible to draw the heat from the battery 55 and the motor unit 65 via the heat medium, and carry the drawn heat to the indoor condenser 4 to use the heat for heating the vehicle compartment while cooling the battery 55 and the motor unit 65.

<Switching of the Mode of the Heating Operation>

Figure 10:
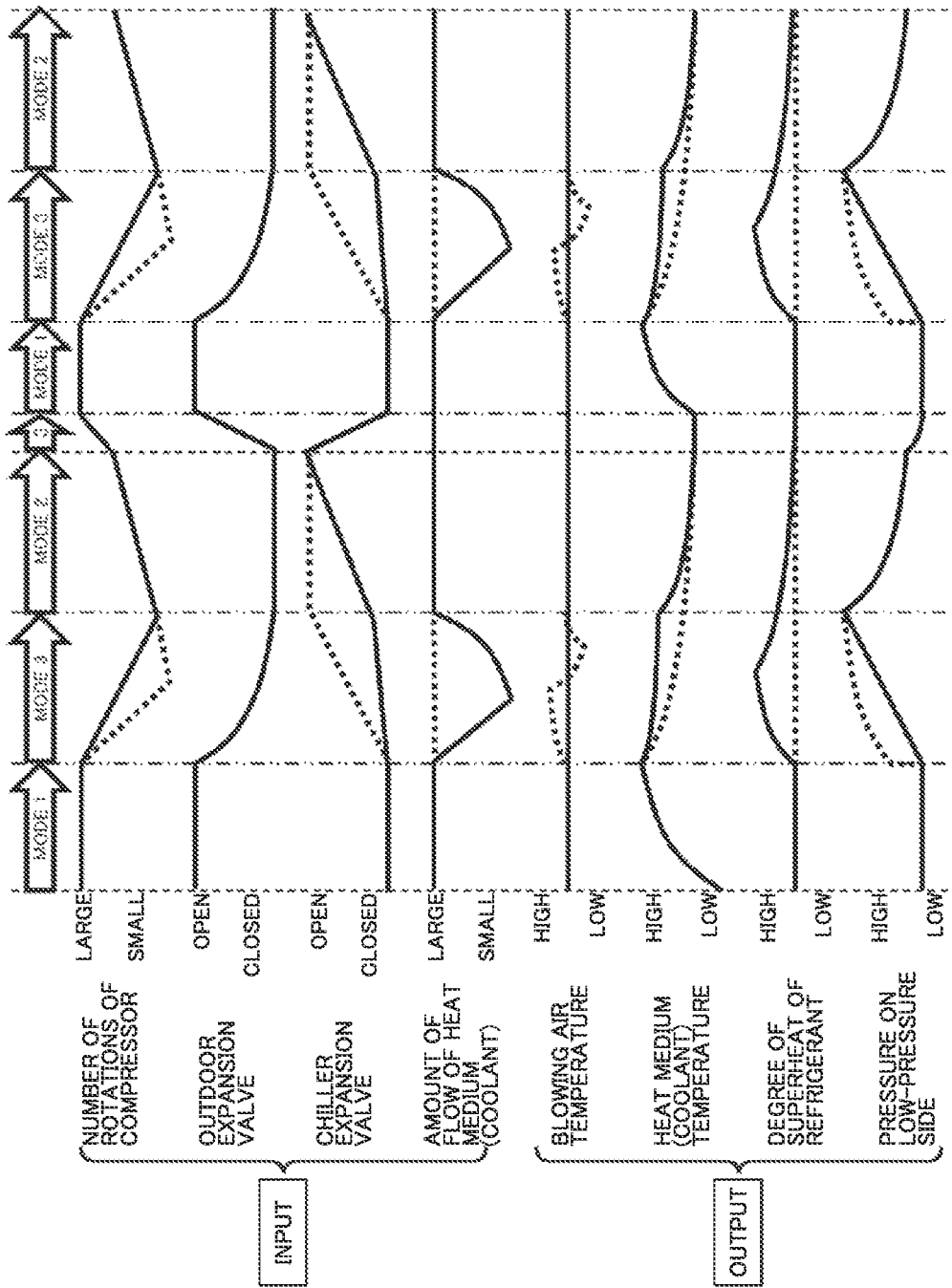
FIG. 10 illustrates control of switching from the outdoor air heat absorption heating mode (MODE 1) to the waste heat recovery heating mode (MODE 2) of the vehicle air conditioning apparatus according to the embodiment of the invention, and a graph representing the result of the control, where a compressor, an outdoor expansion valve, a chiller expansion valve, a first circulating pump, and a second circulating pump are controlled.

Hereinafter, control of switching the mode from the outdoor air heat absorption heating mode (MODE 1) to the waste heat recovery heating mode (MODE 2) will be described with reference to FIG. 10. FIG. 10 illustrates control of the heat pump ECU 11 to control the compressor 2, the outdoor expansion valve 6, the chiller expansion valve 73, the first circulating pump 62, and the second circulating pump 63, and a graph representing the result of the control. The upper part indicates the control (input) of the heat pump ECU 32, and the lower part indicates the result of the control in the upper part. In addition, dashed lines indicate a reference (conventional) example, and solid lines indicate the control and the control result about the vehicle air conditioning apparatus 1 according to the present embodiment.

(1) Control of Switching the Mode According to the Reference Example

In the vehicle air conditioning apparatus according to the reference example, when the outdoor air heat absorption heating mode is switched to the waste heat recovery heating mode, the heat pump ECU 11 controls the degree of opening of the chiller expansion valve 73 to be a target value at a constant speed, in order to perform a heat exchange between the refrigerant and the heat medium in the refrigerant-heat medium heat exchanger 64.

With the reference example, the chiller expansion valve 73 is controlled such that the degree of opening becomes the target value until the outdoor expansion valve 6 becomes fully closed, that is, until the switching from the outdoor air heat absorption heating mode to the waste heat recovery heating mode is completed from the start of the switching (during the operating period in the combination heating mode). In addition, together with the control of the degree of opening of the chiller expansion valve 73, the number of rotations of the compressor 2 is controlled to be reduced, based on the refrigerant pressure on the high-pressure side of the refrigerant circuit R, that is, the temperature of the air supplied from the blowing outlet 29 into the vehicle compartment. The actions of the first circulating pump 62 and the second circulating pump 63 are not varied, and therefore the amount of flow of the heat medium circulating in the refrigerant-heat medium heat exchanger 64 is not varied.

In this case, as illustrated in FIG. 10, the degree of opening of the chiller expansion valve 73 becomes the target valve when the outdoor expansion valve 6 is closed, and therefore it is possible to promptly absorb the heat from the heat medium. However, when the temperature of the heat medium is higher than the temperature of the outdoor air, the refrigerant pressure on the low-pressure side of the refrigerant circuit R, in particular, the pressure of the refrigerant downstream of the refrigerant-heat medium heat exchanger 64 is rapidly increased. Although the number of rotations of the compressor 2 has been reduced, it is not sufficient to merely reduce the number of rotations. Accordingly, the temperature of the air supplied from the blowing outlet 29 into the vehicle compartment is fluctuated, and therefore the passengers may feel uncomfortable.

(2) Control of Switching the Mode According to the Present Embodiment

With the present embodiment, when the outdoor air heat absorption heating mode is switched to the waste heat recovery heating mode, the heat pump ECU 11 controls the outdoor expansion valve 6 to be closed, and meanwhile, controls the degree of superheat of pressure of the refrigerant to be temporarily increased on the downstream side (refrigerant outlet side) of the refrigerant-heat medium heat exchanger 64.

To be more specific, the heat pump ECU 11 controls the outdoor expansion valve 6 to be closed, and controls the chiller expansion valve 73 to be slowly opened up to a predetermined degree of opening until the outdoor expansion valve 6 is fully closed, that is, until the switching from the outdoor air heat absorption heating mode to the waste heat recovery heating mode is completed from the start of the switching (during the operating period in the combination heating mode).

In addition, together with the control of the degree of opening of the chiller expansion valve 73, the number of rotations of the compressor 2 is controlled to be reduced, based on the refrigerant pressure on the high-pressure side of the refrigerant circuit R, that is, the temperature of the air supplied from the blowing outlet 29 into the vehicle compartment. In this case, the chiller expansion valve 73 is slowly opened up to the predetermined degree of opening but is not fully opened. By this means, the number of rotations of the compressor 2 is reduced more slowly than the reference example described above. Moreover, the first circulating pump 62 and the second circulating pump 62 are controlled to temporarily reduce the amount of flow (the amount of circulation) of the heat medium circulating through the device temperature adjustment circuit 61, and increase the amount of flow of the heat medium again, and therefore to recover the amount of flow of the heat medium until the outdoor expansion valve 6 is fully closed. Here, the switching of the mode to the waste heat recovery heating mode is completed when the outdoor expansion valve 6 is fully closed and the heat exchange between the outdoor air and the refrigerant in the outdoor heat exchanger 7 is no longer performed.

During the operating period in the combination heating mode, the opening of the chiller expansion valve 73 is restricted to the predetermined degree of opening (is not fully opened), and the amount of flow of the heat medium is temporarily reduced. Therefore, the temperature of the heat medium during the operating period in the combination heating mode is higher, that is, the amount of heat absorbed from the heat medium into the refrigerant in the refrigerant-heat medium heat exchanger 64 is smaller, than the reference example described above. By the control in this way, it is possible to increase the degree of superheat of the refrigerant on the downstream side (refrigerant outlet side) of the refrigerant-heat medium heat exchanger 64 to prevent a surge in the refrigerant pressure on the low-pressure side of the refrigerant circuit R, in particular, the downstream side of the refrigerant-heat medium heat exchanger 64.

In addition, the heat pump ECU 11 controls the degree of opening of the chiller expansion valve 73 to be increased after a predetermined period of time has elapsed from the start of the switching from the outdoor air heat absorption heating mode to the waste heat recovery heating mode, for example, at the time of the completion of the switching to the waste heat recovery heating mode. By this means, the amount of heat absorbed from the heat medium into the refrigerant is increased in the refrigerant-heat medium heat exchanger 64, the degree of superheat of the refrigerant on the downstream side (refrigerant outlet side) of the refrigerant-heat medium heat exchanger 64 is gradually decreased, and the refrigerant pressure on the downstream side of the refrigerant-heat medium heat exchanger 64 is also decreased.

As described above, the vehicle air conditioning apparatus 1 according to the present embodiment increases the degree of superheat of the refrigerant on the downstream side (refrigerant outlet side) of the refrigerant-heat medium heat exchanger 64 when the outdoor air heat absorption heating mode is switched to the waste heat recovery heating mode, and therefore to prevent a surge in the refrigerant pressure on the low-pressure side of the refrigerant circuit R, in particular, on the downstream side of the refrigerant-heat medium heat exchanger 64. By this means, it is possible to prevent the fluctuation in the temperature of the air blowing out from the indoor condenser 4, and therefore to prevent the fluctuation in the temperature of the air supplied into the vehicle compartment to keep the temperature constant.

Here, the refrigerant pipe 13F from the indoor condenser 4 to the inlet of the outdoor heat exchanger 7 in the refrigerant circuit R is longer and thicker than the other refrigerant pipes. By this means, it is possible to increase the amount of refrigerant during the heating. Moreover, a receiver as a refrigerant reservoir may be disposed on the high-pressure side of the refrigerant circuit R, for example, in the refrigerant outlet of the outdoor heat exchanger 7, to form a receiver cycle.

Modification 1

Figure 11:
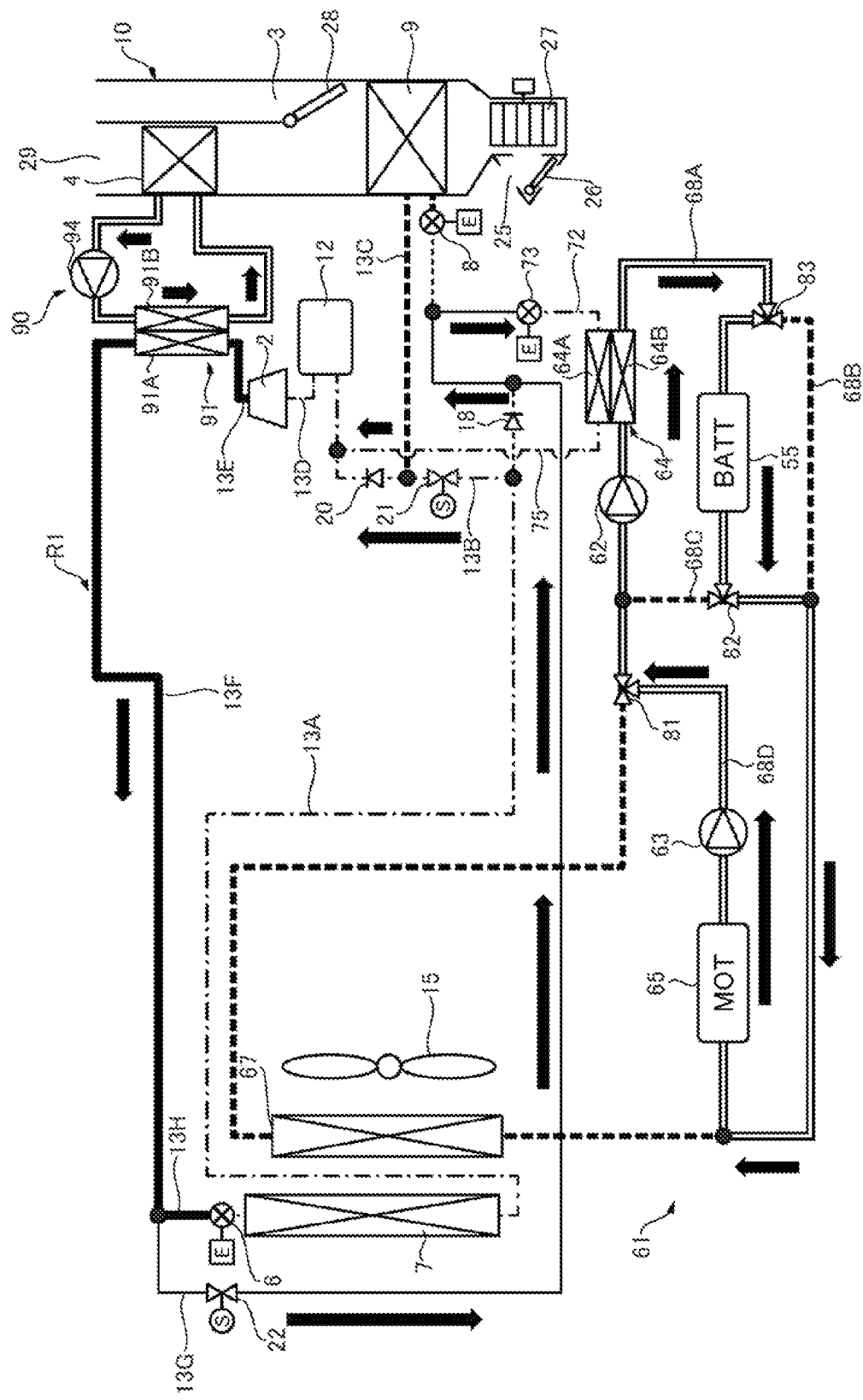
FIG. 11 illustrates a schematic configuration of a refrigerant circuit R1 of the vehicle air conditioning apparatus according to Modification 1 of the invention.

FIG. 11 illustrates a schematic configuration of a refrigerant circuit R1 of the vehicle air conditioning apparatus according to Modification 1 of the embodiment. A refrigerant flow path 91A of a refrigerant-heat medium heat exchanger 91 is connected to the refrigerant circuit R1 of the vehicle air conditioning apparatus according to Modification 1, and a heat medium circuit 90 is connected to a heat medium flow path 91B of the refrigerant-heat medium heat exchanger 91. The refrigerant flow path 91A of the refrigerant-heat medium heat exchanger 91 constitutes part of the refrigerant circuit R1, and the heat medium flow path 91B of the refrigerant-heat medium heat exchanger 91 constitutes part of the heat medium circuit 90. The indoor condenser 4 is provided in the heat medium circuit 90.

Therefore, the refrigerant having a high temperature and a high pressure discharged from the compressor 2 is subjected to a heat exchange with the heat medium being circulated through the heat medium circuit 90 by a circulating pump 94 in the refrigerant-heat medium heat exchanger 91, and the heat of the refrigerant is removed by the heat medium, and therefore the refrigerant is cooled and consequently condensed and liquefied. The temperature of the heat medium in the heat medium circuit 90 becomes high, and the air in the air flow passage 3 ventilated through the indoor condenser 4 is heated by the heat medium having a high temperature circulating in the indoor condenser 4.

Modification 2

Figure 12:
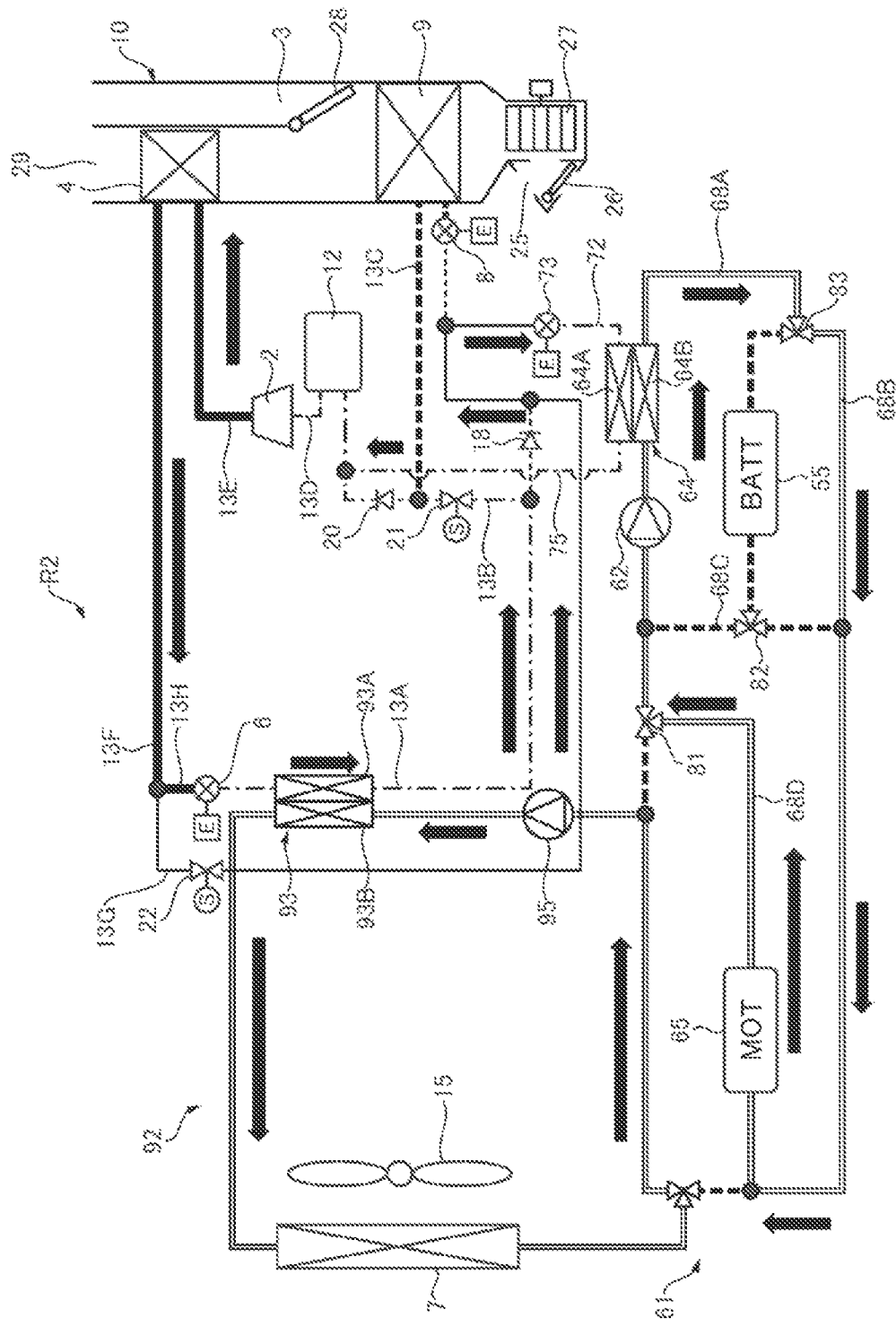
FIG. 12 illustrates a schematic configuration of a refrigerant circuit R2 of the vehicle air conditioning apparatus according to Modification 2 of the invention.

FIG. 12 illustrates a schematic configuration of a refrigerant circuit R2 of the vehicle air conditioning apparatus according to Modification 2 of the embodiment. A refrigerant flow path 93A of a refrigerant-heat medium heat exchanger 93 is connected to the refrigerant circuit R2 of the vehicle air conditioning apparatus according to Modification 2, and a heat medium circuit 92 is connected to a heat medium flow path 93B of the refrigerant-heat medium heat exchanger 93. The refrigerant flow path 93A of the refrigerant-heat medium heat exchanger 93 constitutes part of the refrigerant circuit R2, and the heat medium flow path 93B of the refrigerant-heat medium heat exchanger 93 constitutes part of the heat medium circuit 92. The outdoor heat exchanger 7 is provided in the heat medium circuit 92.

In the heat medium circuit 92, the heat medium is subjected to a heat exchange with the outdoor air flowing from the outside while the vehicle is moving, or the outdoor air ventilated by the outdoor air blower 15. The refrigerant liquefied in the indoor condenser 4 exits from the indoor condenser 4, and then passes through the refrigerant pipes 13F and 13H, and reaches the outdoor expansion valve 6. The refrigerant is decompressed by the outdoor expansion valve 6, and then flows into the refrigerant-heat medium heat exchanger 93. The refrigerant is subjected to a heat exchange with the heat medium being circulated through the heat medium circuit 92 by a circulating pump 95 in the refrigerant-heat medium heat exchanger 93. The refrigerant with a low temperature and a low pressure having exited from the refrigerant-heat medium heat exchanger 93 passes through the refrigerant pipes 13A and 13B, the solenoid valve 21, and the check valve 20, and flows into the accumulator 12.

Modification 3

Figure 13:
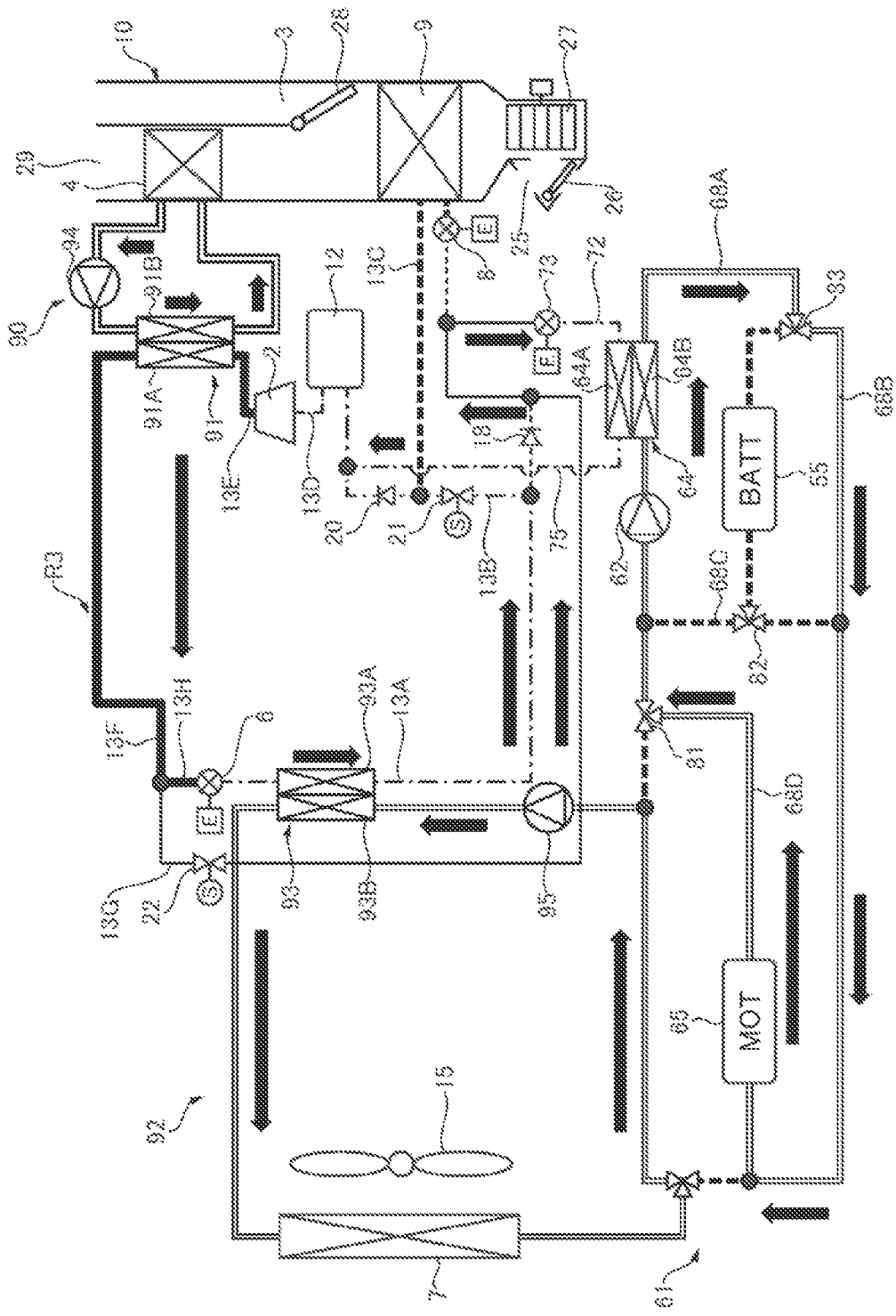
FIG. 13 illustrates a schematic configuration of a refrigerant circuit R3 of the vehicle air conditioning apparatus according to Modification 3 of the invention.

FIG. 13 illustrates a schematic configuration of a refrigerant circuit R3 of the vehicle air conditioning apparatus according to Modification 3 of the embodiment. The refrigerant flow path 91A of the refrigerant-heat medium heat exchanger 91 and the refrigerant flow path 93A of the refrigerant-heat medium heat exchanger 93 are connected to the refrigerant circuit R3 of the vehicle air conditioning apparatus according to Modification 3. Meanwhile, the heat medium circuit 90 is connected to the heat medium flow path 91B of the refrigerant-heat medium heat exchanger 91, and the heat medium circuit 92 is connected to the heat medium flow path 93B of the refrigerant-heat medium heat exchanger 93.

The refrigerant flow path 91A of the refrigerant-heat medium heat exchanger 91 constitutes part of the refrigerant circuit R3, and the heat medium flow path 91B of the refrigerant-heat medium heat exchanger 91 constitutes part of the heat medium circuit 90. The refrigerant flow path 93A of the refrigerant-heat medium heat exchanger 93 constitutes part of the refrigerant circuit R3, and the heat medium flow path 93B of the refrigerant-heat medium heat exchanger 93 constitutes part of the heat medium circuit 92. The indoor condenser 4 is provided in the heat medium circuit 90, and the outdoor heat exchanger 7 is provided in the heat medium circuit 92.

The refrigerant having a high temperature and a high pressure discharged from the compressor 2 is subjected to a heat exchange with the heat medium being circulated through the heat medium circuit 90 by the circulating pump 94 in the refrigerant-heat medium heat exchanger 91, and the heat of the refrigerant is removed by the heat medium, and therefore the refrigerant is cooled and consequently condensed and liquefied. Meanwhile, the temperature of the heat medium in the heat medium circuit 90 becomes high, and the air in the air flow passage 3 is ventilated through the indoor condenser 4, and therefore the air in the air flow passage 3 is heated by the heat medium having a high temperature circulating in the indoor condenser 4.

In the heat medium circuit 92, the heat medium is subjected to a heat exchange with the outdoor air flowing from the outside while the vehicle is moving, or the outdoor air ventilated by the outdoor blower 15. The refrigerant liquefied in the indoor condenser 4 exits from the indoor condenser 4, and then passes through the refrigerant pipes 13F and 13H, and reaches the outdoor expansion valve 6. The refrigerant is decompressed by the outdoor expansion valve 6, and then flows into the refrigerant-heat medium heat exchanger 93. The refrigerant is subjected to a heat exchange with the heat medium being circulated through the heat medium circuit 92 by the circulating pump 95 in the refrigerant-heat medium heat exchanger 93. The refrigerant with a low temperature and a low pressure having exited from the refrigerant-heat medium heat exchanger 93 passes through the refrigerant pipes 13A and 13B, the solenoid valve 21, and the check valve 20, and flows into the accumulator 12.

The vehicle air conditioning apparatus according to Modification 1 to Modification 3 also can perform the three heating modes including the outdoor air heat absorption heating mode, the waste heat recovery heating mode, and the combination heating mode. In addition, when the outdoor heat absorption heating mode (MODE 1) is switched to the waste heat recovery heating mode (MODE 2), the outdoor expansion valve 6 is controlled to be closed, and meanwhile, the degree of superheat of pressure of the refrigerant is controlled to be temporarily increased on the downstream side (refrigerant outlet side) of the refrigerant-heat medium heat exchanger 64 (see FIG. 10). To be more specific, the heat pump ECU 11 controls the outdoor expansion valve 6 to be closed, and controls the chiller expansion valve 73 to slowly open up to the predetermined degree of opening until the outdoor expansion valve 6 becomes fully closed, that is, until the switching from the outdoor air heat absorption heating mode to the waste heat recovery heating mode is completed from the start of the switching (during the operating period in the combination heating mode).

With the control in this way, also the vehicle air conditioning apparatus according to Modification 1 to Modification 3 increases the degree of superheat of the refrigerant on the downstream side (refrigerant outlet side) of the refrigerant-heat medium heat exchanger 64 to prevent a surge in the refrigerant pressure on the low-pressure side of the refrigerant circuit R, in particular, on the downstream side of the refrigerant-heat medium heat exchanger 64, when the outdoor air heat absorption heating mode is switched to the waste heat recovery heating mode. By this means, it is possible to prevent the fluctuation in the temperature of the air blowing out from the indoor condenser 4, and therefore to prevent the fluctuation in the temperature of the air supplied into the vehicle compartment to keep the temperature constant.

As described above, the embodiments of the present invention have been described in detail with reference to the drawings. However, the specific configuration is not limited to these embodiments, and the design can be changed without departing from the scope of the present invention.

REFERENCE SIGNS LIST

1: vehicle air conditioning apparatus,
2: compressor,
3: air flow passage,
4: indoor condenser,
6: outdoor expansion valve,
7: outdoor heat exchanger,
8: indoor expansion valve,
9: heat absorbing device,
11: heat pump ECU (controller)
61: device temperature adjustment circuit,
62; first circulating pump,
63: second circulating pump,
64, 91, 93: refrigerant-heat medium heat exchanger,
73: chiller expansion valve

The invention claimed is:

1. A vehicle air conditioning apparatus comprising:
a refrigerant circuit including:
   a compressor configured to compress refrigerant;
   an outdoor heat exchanger configured to cause a heat exchange between the refrigerant and outdoor air;
   a heat releasing device configured to heat air supplied into a vehicle compartment;
   a first electronic expansion valve provided on a refrigerant inlet side of the outdoor heat exchanger;
   a refrigerant-heat medium heat exchanger; and
   a second electronic expansion valve provided on a refrigerant inlet side of the refrigerant-heat medium heat exchanger;
a heat medium circuit configured to circulate heat medium to cause a heat exchange between the refrigerant and the heat medium in the refrigerant-heat medium heat exchanger; and
a controller configured to control the refrigerant circuit and the heat medium circuit,
wherein, during heating operation to heat the vehicle compartment by using the heat releasing device, the controller has heating modes including:
an outdoor air heat absorption heating mode to absorb heat from the outdoor heat exchanger into the refrigerant discharged from the compressor and having released heat in the heat releasing device; and
a waste heat recovery heating mode to absorb heat from the refrigerant-heat medium heat exchanger into the refrigerant discharged from the compressor and having released heat in the heat releasing device, and
when the outdoor air heat absorption heating mode is switched to the waste heat recovery heating mode, the controller controls the first electronic expansion valve to be closed, and controls a degree of superheat of the refrigerant to be increased on a downstream side of the refrigerant-heat medium heat exchanger.

2. The vehicle air conditioning apparatus according to claim 1, wherein the controller controls a degree of opening of the second electronic expansion valve to increase the degree of superheat of the refrigerant on the downstream side of the refrigerant-heat medium heat exchanger.

3. The vehicle air conditioning apparatus according to claim 1, wherein the controller controls the degree of opening of the second electronic expansion valve after a predetermined period of time has elapsed from start of the switching to the waste heat recovery heating mode to decrease the degree of superheat of the refrigerant on the downstream side of the refrigerant-heat medium heat exchanger.

4. The vehicle air conditioning apparatus according to claim 1, wherein:
    a pump configured to circulate the heat medium is provided in the heat medium circuit; and
    when the outdoor air heat absorption heating mode is switched to the waste heat recovery heating mode, the controller controls a number of rotations of the pump to reduce an amount of circulation of the heat medium.

5. The vehicle air conditioning apparatus according to claim 1, wherein a refrigerant reservoir is provided in a refrigerant outlet of the outdoor heat exchanger.

6. The vehicle air conditioning apparatus according to claim 1, wherein a refrigerant pipe from the heat releasing device to a refrigerant inlet of the outdoor heat exchanger is longer and thicker than other refrigerant pipes in the refrigerant circuit.

7. The vehicle air conditioning apparatus according to claim 1, wherein:
    the heat medium circuit is a device temperature adjustment circuit; and
    the heat medium is circulated through the device temperature adjustment circuit to recover heat from a temperature-adjusted subject mounted in a vehicle by the refrigerant-heat medium heat exchanger.

8. The vehicle air conditioning apparatus according to claim 2, wherein the controller controls the degree of opening of the second electronic expansion valve after a predetermined period of time has elapsed from start of the switching to the waste heat recovery heating mode to decrease the degree of superheat of the refrigerant on the downstream side of the refrigerant-heat medium heat exchanger.

9. The vehicle air conditioning apparatus according to claim 2, wherein:
    a pump configured to circulate the heat medium is provided in the heat medium circuit; and
    when the outdoor air heat absorption heating mode is switched to the waste heat recovery heating mode, the controller controls a number of rotations of the pump to reduce an amount of circulation of the heat medium.

10. The vehicle air conditioning apparatus according to claim 3, wherein:
    a pump configured to circulate the heat medium is provided in the heat medium circuit; and
    when the outdoor air heat absorption heating mode is switched to the waste heat recovery heating mode, the controller controls a number of rotations of the pump to reduce an amount of circulation of the heat medium.

11. The vehicle air conditioning apparatus according to claim 2, wherein a refrigerant reservoir is provided in a refrigerant outlet of the outdoor heat exchanger.

12. The vehicle air conditioning apparatus according to claim 3, wherein a refrigerant reservoir is provided in a refrigerant outlet of the outdoor heat exchanger.

13. The vehicle air conditioning apparatus according to claim 4, wherein a refrigerant reservoir is provided in a refrigerant outlet of the outdoor heat exchanger.

14. The vehicle air conditioning apparatus according to claim 2, wherein a refrigerant pipe from the heat releasing device to a refrigerant inlet of the outdoor heat exchanger is longer and thicker than other refrigerant pipes in the refrigerant circuit.

15. The vehicle air conditioning apparatus according to claim 3, wherein a refrigerant pipe from the heat releasing device to a refrigerant inlet of the outdoor heat exchanger is longer and thicker than other refrigerant pipes in the refrigerant circuit.

16. The vehicle air conditioning apparatus according to claim 4, wherein a refrigerant pipe from the heat releasing device to a refrigerant inlet of the outdoor heat exchanger is longer and thicker than other refrigerant pipes in the refrigerant circuit.

17. The vehicle air conditioning apparatus according to claim 2, wherein:
    the heat medium circuit is a device temperature adjustment circuit; and
    the heat medium is circulated through the device temperature adjustment circuit to recover heat from a temperature-adjusted subject mounted in a vehicle by the refrigerant-heat medium heat exchanger.

18. The vehicle air conditioning apparatus according to claim 3, wherein:
    the heat medium circuit is a device temperature adjustment circuit; and
    the heat medium is circulated through the device temperature adjustment circuit to recover heat from a temperature-adjusted subject mounted in a vehicle by the refrigerant-heat medium heat exchanger.

19. The vehicle air conditioning apparatus according to claim 4, wherein:
    the heat medium circuit is a device temperature adjustment circuit; and
    the heat medium is circulated through the device temperature adjustment circuit to recover heat from a temperature-adjusted subject mounted in a vehicle by the refrigerant-heat medium heat exchanger.

20. The vehicle air conditioning apparatus according to claim 5, wherein:
    the heat medium circuit is a device temperature adjustment circuit; and
    the heat medium is circulated through the device temperature adjustment circuit to recover heat from a temperature-adjusted subject mounted in a vehicle by the refrigerant-heat medium heat exchanger.

* * * * *